United States Patent [19]

D'Antonio

[11] Patent Number: 4,892,325
[45] Date of Patent: Jan. 9, 1990

[54] MOTION DETECTOR

[76] Inventor: Nicholas F. D'Antonio, 7695 Admiral Dr., Liverpool, N.Y. 13088

[21] Appl. No.: 338,092

[22] Filed: Jan. 8, 1982

[51] Int. Cl.⁴ .............................................. A63C 9/08
[52] U.S. Cl. ................................. 280/612; 324/61 P; 73/862.04
[58] Field of Search ....................... 280/611, 612, 613; 324/61 R, 61 P; 377/5; 73/862.04, 862.02, 172; 307/201

[56] References Cited

U.S. PATENT DOCUMENTS

| | | | |
|---|---|---|---|
| 3,218,551 | 11/1965 | Cook | 324/61 P |
| 3,940,754 | 2/1976 | Weber | 324/61 P |
| 4,160,555 | 7/1979 | Salomon | 280/612 |
| 4,291,894 | 9/1981 | D'Antonio et al. | 280/612 |
| 4,347,478 | 8/1982 | Heerens et al. | 324/61 P |
| 4,371,188 | 2/1983 | Holl | 73/862.04 |
| 4,457,532 | 7/1984 | Knabel | 280/612 |

*Primary Examiner*—David M. Mitchell
*Attorney, Agent, or Firm*—D. Peter Hochberg; Mark Kusner; Louis J. Weisz

[57] ABSTRACT

A micropower electronic motion detector including a sensing element and a source element for measuring the magnitude and direction of the relative motion of the sensing element with respect to the source element. Electronic apparatus for nulling the output signal of the detector and of other electronic sensing apparatus in its initial or static state is also disclosed. The detector may be used in a safety ski binding to measure the forces being exerted on a skier's leg so that a binding release or non-release decision may be made.

21 Claims, 7 Drawing Sheets

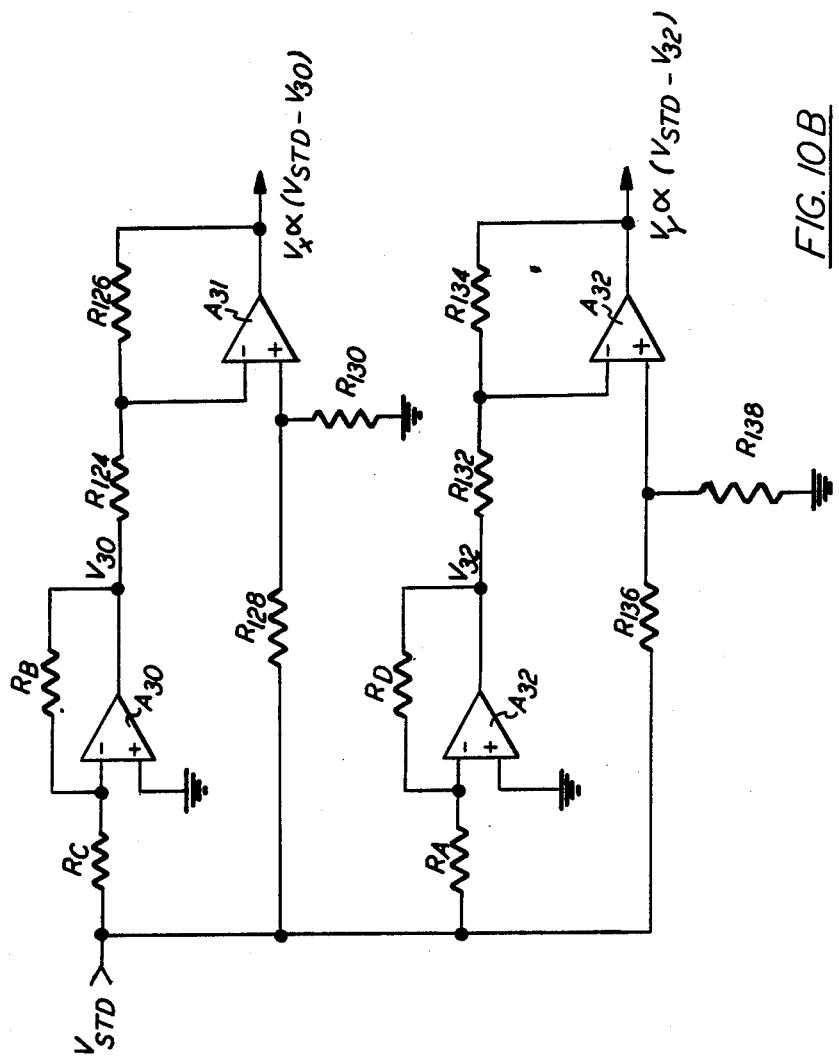

MOTION DETECTOR

The present invention relates to electronic detection of the relative movement between two bodies and particularly to low power consumption apparatus therefor.

In numerous applications it is desirable to measure changes of relative positions of two bodies. Electronic detection of shifts in relative position permits the generation of an electrical error signal to control or activate the response of a connected device. Likewise, an electronic motion detector may generate a signal having a characteristic, such as magnitude or frequency, of direct interest. Where the detector must function from an isolated power supply, e.g., a battery, it is particularly important that the detector consume as little power as possible to ensure prolonged power supply life. It is also useful to detect relative position shifts along more than one axis in order to distinguish the magnitude and direction of a shift.

A particularly useful application of a detector according to the disclosed invention is in a safety ski binding where small movements of a skier's boot in response to the stresses between the ski and the skier's leg are desired to be measured. From that measurement a determination can be made as to whether or not the force imperil the skier's safety mandating release of the ski from the skier's boot. Electronic apparatus for sensing forces and making release/non-release decisions is disclosed in U.S. Pat. Nos. 4,055,078 and 4,291,894, in both of which I am a co-inventor. Light-activated and magnetically activated detectors are disclosed in the latter.

SUMMARY OF THE INVENTION

The advantages of the present invention are achieved by providing a detector having a sensing means and a source means. In the preferred embodiments of the invention, the sensing means includes a sensing element provided with sensitive areas or devices from which the relative motion of the two bodies is sensed or detected. The source means includes a source element providing a reference source, e.g., light, voltage, etc., which activates the sensing means or otherwise permits detection of the relative movement of the elements.

One of the sensing and source means is fixed to a body the movement of which is to be detected, and the other to the reference body. When those bodies move relative to each other, the detector elements cooperate to produce electronically detectable changes, i.e., changes in currents, voltages or in the values of circuit parameters, reflecting the relative movement of the two bodies. By measuring the amount and direction of these changes, the magnitude and the direction of relative movements between the bodies to which the detector elements are fixed may be determined.

Embodiments of a detector having the advantages of the present invention may have a sensing elements and source elements, respectively, photosensors and a light source, capacitor plates and a reference capacitor plate, sheet resistances and a moveable resistance probe or Hall Effect sensors and a magnetic field. In preferred embodiments, the sensing element has four discrete sensors or four independently sensitive regions. For each of the pairs of elements in the embodiments, a change in a characteristic associated with each of the four areas or devices may be correlated with relative movement along each of two axes. That is, for these embodiments, respectively, a change in photovoltage or photocurrent, a change in capacitance, a change in resistance or a change in Hall voltages or currents, may be indicative of two dimensional relative motion. Regardless of the particular embodiment of the invention, the electrical characteristic changes can be measured directly or indirectly through electronic measurement means.

The invention includes means for emphasizing one or more of the measured signals, with respect to the others, and for selecting the larger or largest magnitude signal, whether emphasized or not, for further electronic processing.

An additional advantage of the invention resides in electronic means for balancing the detector or other electronic sensing device, i.e., establishing a zero baseline, automatically and electronically when the detector or any other electronic sensing device is in its initial or quiescent state. This electronic adjustment eliminates the necessity of bringing the detector elements into precise mechanical alignment before use. The balancing means sums the quiescent state signal with a variable magnitude balancing signal to achieve an approximately zero magnitude initial state signal. The preferred embodiment of the electronic balancing means includes a digital counting means which provides the necessary balancing signal to bring the measuring means output signal to zero, within a minimum error chosen by the user. Because the balancing signal is digital, it is not readily susceptible to analog noise interference.

In the preferred embodiments of the present invention, the advantage of long power supply life is achieved either by using inherently low-power circuits or by operating the detector only a portion of the time. In the latter case, the detector operates in a pulsed mode with the sample rate and pulse duration chosen to avoid loss of fidelity of the signal produced by the movement of the two bodies.

An especially useful advantage of the preferred forms of the invention is the simple circuitry for determining the magnitude and direction of relative movement of the two bodies to which the detector elements are fixed. In application to a safety ski binding, the detector has the advantage of eliminating complex circuitry to sense forces and process force signals for use in making a decision to release or not to release the binding. This simplification significantly reduces costs of manufacture while increasing reliability and ease of maintenance and repair.

BRIEF DESCRIPTION OF THE DRAWINGS

FIG. 10A is a schematic diagram of a dual axis Hall Effect detector according to an embodiment of the present invention. FIG. 10B is a schematic diagram of circuitry for use with a dual axis Hall Effect detector according to an embodiment of the present invention.

DESCRIPTION OF PREFERRED EMBODIMENTS

The detector of the embodiments of the invention described below functions through a sensing means, including a number of regions or devices, for sensing changes in electrical values, for example in voltage, current, resistance, capacitance, or inductance. The detector also includes a source means for activating and/or providing a reference source through which the changes in electrical values are sensed, and a measuring means for interpreting the electrical value changes and generating electrical output signals in response to the electrical value changes. The sensing and source means comprise a sensing element, having at least two sensitive devices or areas, and source element, respectively. Each of the sensing and source elements themselves are affixed to one of two objects or bodies so that the elements move with respect to each other when the bodies move. The number of sensitive devices or regions in the sensing means determines the dimensional capacity of a detector. For example, by using a sensing element having four sensitive regions or devices at least four changes may be sensed when one element moves with respect to the other. Thus, the measuring means output signals indicate not only whether the elements have moved with respect to each other, but by how much and in what direction. The magnitude and directions of three dimensional movements can be detected by using two quadrant detectors mounted generally perpendicular to each other or by employing a detector having, effectively, at least five sensors. As discussed herein in connection with the embodiment of the invention employing four capacitive sensing regions, four sensors can in some instances be made to act as five and to provide a Z axis indication along with the X and Y axis indications. The detector of the invention includes sensing elements having one or more sensitive regions or devices depending upon the dimensional capacity desired in any particular application of the detector.

The detector of the present invention is particularly suited to measuring movements or shifts which originate from and, from time to time, substantially return to an initial or static position. In that static position, the detector is adjusted to be in a static or null condition.

Figure 1:
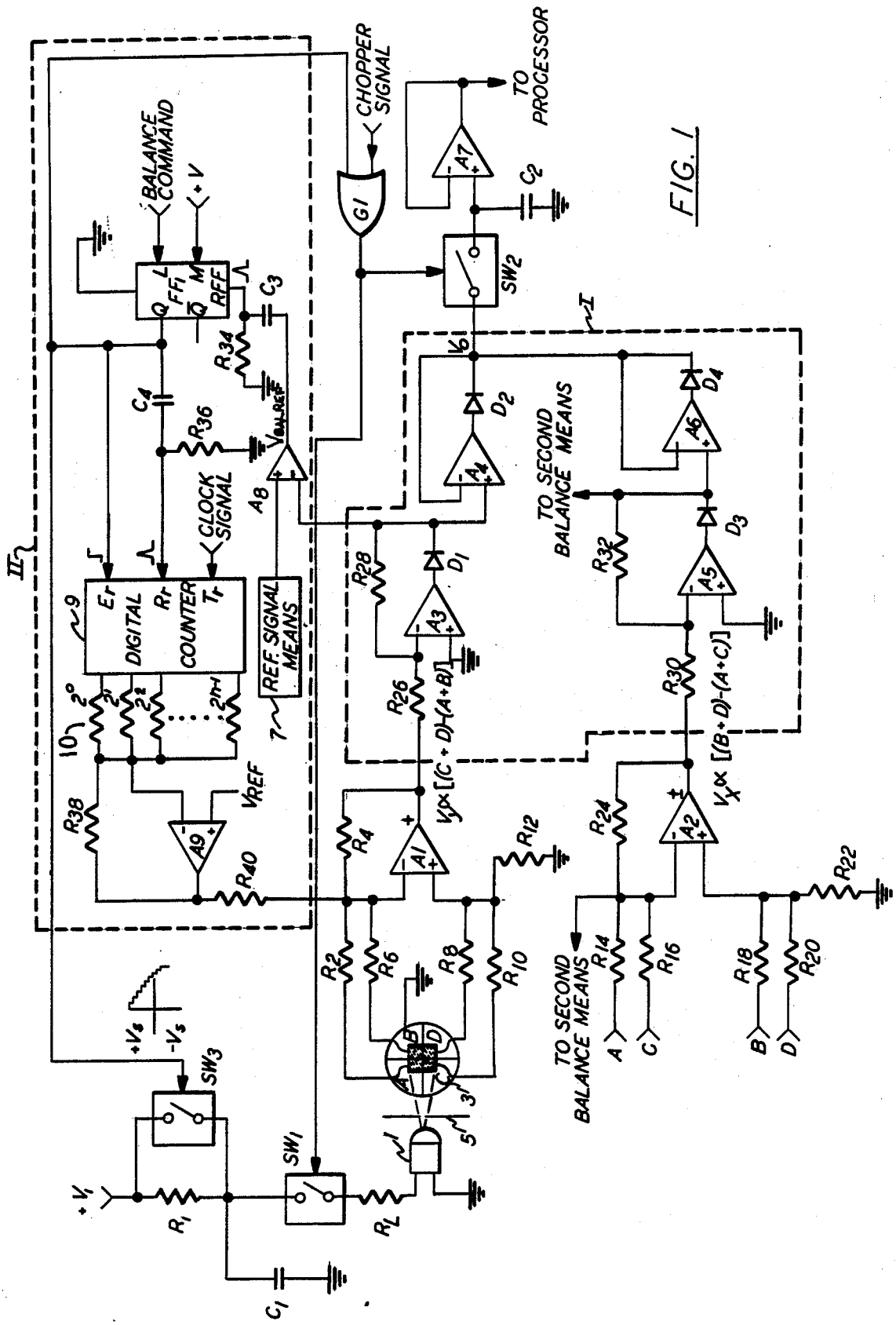
FIG. 1 is a schematic diagram of a light-activated dual axis detector and associated signal processing and balancing circuitry according to an embodiment of the present invention.

Referring now to FIG. 1, there is shown a schematic diagram of one preferred embodiment of the present detector invention including as a source element a light source 1 and as a sensing element a photosensor 3 comprising four, mutually electrically isolated, photosensitive regions, A, B, C and D. While each of those regions is shown in FIG. 1 as being of the same shape and area, i.e. a quarter of a circle, and as having generally perpendicular boundaries, the invention is not limited to a detector having a sensing element with similarly shaped sensing regions or lying in a single plane. Some applications may require that all of the sensing elements, whether more or less than four, not be of the same size and shape and/or that the division between them not intersect at substantially right angles. Obviously, at least two sensing regions are required to permit the detection of motion. In FIG. 1, the photosensitive regions are shown to be formed on a substantially planar substrate. However, neither planarity nor integration of the photosensors is essential to the invention. The sensing element, here photosensors, for example, could be discrete photocells fixed to numerous locations on a three dimensional surface. Nevertheless, for simplicity, the present description discusses only the preferred embodiments of the invention, that is, sensing elements employing four sensing regions, each having substantially the same shape and area, with mutual boundaries intersecting at substantially right angles. In these preferred embodiments, the quadrants are contiguous, although electrically mutually isolated. In FIG. 1, each region is a separate photosensor and, as is preferable, all the photosensors are fabricated on a single substrate. When light falls on photosensor 3, a current or voltage is generated by each photosensor in relation to the amount of light striking it. Light source 1 may be any compact light source having a long life, and, preferably, a fast response time relative to any modulation of light source 1. Light source 1 is preferably a solid state light emitting diode (LED), which may be a laser. Its light output need not be visible. The four regions of photosensor 3 are preferably solid state photosensors having a high sensitivity to the wavelengths emitted by source 1. The extent of the illumination of photosensor 3 by light source 1 is limited by an iris 5 interposed between the light source and photosensor 3, to the area shown by cross-hatching in FIG. 1. That area is shown as rectangular in FIG. 1, but the iris opening could have other shapes.

Light source 1 is mounted on one body, the relative motion of which is to be sensed and photosensor 3 on another or reference body. When photosensor 3 moves with respect to light source 1, the amount of light falling on quadrants A-D changes resulting in changes in the photovoltages or photocurrents produced by at least some of the photosensors. For example, if photosensor 3 moves in the direction of the line separating regions A and C from regions B and D, toward regions A and B, the amount of light falling on regions A and B will decrease because of the shadow cast by iris 5 and there will be an increase in the amount of light falling on regions C and D. That is, for this relative movement, referred to herein as along the Y axis, the photovoltages generated by regions A and B decrease, whereas those for regions C and D increase. Similarly, a relative movement along a substantially perpendicular direction, referred to herein as along the X axis, causes decreases in the photovoltages generated by regions A and C, while the photovoltages of regions B and D increase, or vice versa, depending upon the direction of the motion along the X axis. By sensing and interpreting these changes, the direction as well as the amount of relative movement of the bodies to which the detector elements are attached may be determined.

Photosensor 3 may be fabricated by conventional means such as by depositing on a substrate a photosensitive material or by conventional integrated circuit techniques. Because these fabrication techniques permit construction of regions of relatively small dimensions, a high degree of sensitivity to the relative movement of photosensor 3 and light source 1 can be obtained. An "amplification" of movement sensitivity can be achieved by increasing the separation of the photosensor and light source, although increasing the separation increases the electronic noise produced by ambient mechanical vibrations and increases the precision with which iris 5 must be formed and positioned. A pair of electrical leads must be provided to each photosensitive region, although the lead to each region which is attached to a power source, may be common to all the regions. In FIG. 1 this common connection is indicated by the ground connection of the substrate which supports the regions.

An embodiment of a measuring means applicable to the photosensor embodiment detector of FIG. 1, for interpreting changes in electrical values as motions, is also shown in FIG. 1. (The embodiments of signal selection means and electronic balancing means shown within the dashed lines designated I and II, respectively, are explained later herein). While the circuitry of FIG. 1 is directed to a dual axis or four region detector, adaption of this embodiment to a detector employing fewer or a larger number of sensing regions will be obvious to one skilled in the art. There, region A is shown connected through a resistor $R_2$ to the negative sense input terminal to a difference amplifier $A_1$, an embodiment of a measuring means, which has a feedback resistor $R_4$ connected between its output terminal and negative sense input terminal. Region B is connected to the same input terminal through a resistor $R_6$. Regions C and D are connected through resistors $R_8$ and $R_{10}$, respectively, to the positive sense terminal of amplifier $A_1$, which is shunted to ground through resistor $R_{12}$. The magnitude of the output signal of amplifier $A_1$ is proportional to the difference between the signals at is input terminals. Thus, if region A generates photovoltage A, region B generates photovoltage B, etc., the output signal, $V_y$, of $A_1$ is proportional to $[(C+D)-(A+B)]$. As earlier explained, when there is a movement along the Y axis toward regions A and B, their signal decreases while the signals from regions C and D increase. That is, $V_y$ increases indicating a relative movement in a particular direction. The amount of the increase in $V_y$ indicates the magnitude of the movement. Similarly, relative movements along the X axis may be detected by an analogous measuring means. As indicated in the lower portion of FIG. 1, regions A and C are connected through resistors $R_{14}$ and $R_{16}$, respectively, to the negative sense input terminal of a difference amplifier $A_2$. Regions B and D are connected through resistors $R_{18}$ and $R_{20}$, respectively, to the positive sense terminal of amplifier $A_2$, which is also shunted to ground through resistor $R_{22}$. Difference amplifier $A_2$ has a feedback resistor $R_{24}$ connected between its output terminal and negative sense input terminal. The output signal, $V_x$, of amplifier $A_2$ is proportional to $[(B+D)-(A+C)]$. That signal discloses the direction and magnitude of movements along the X axis. Because of the high input impedance of difference amplifiers $A_1$ and $A_2$, it is possible to have both connected at the same time, i.e., to simultaneously detect both X and Y axis changes. If, as is preferred, regions A-D are formed simultaneously in or on the same substrate, they will preferably have essentially identical electrical characteristics. Likewise, resistors $R_2$, $R_6$, $R_8$ and $R_{10}$ and resistors $R_{14}$, $R_{16}$, $R_{18}$ and $R_{20}$ may all be of the same value, resistors $R_4$ and $R_{24}$, $R_{12}$ and $R_{22}$, may have the same values, and amplifiers $A_1$ and $A_2$ may have essentially identical characteristics, if totally balanced operation is desired. In that event, it is convenient to produce such matched components by forming all these elements in a single integrated circuit. However, if one of the X and Y axis signals is to be emphasized over the other, then the amplifiers and resistors in the X and Y signal circuits will not have identical values and characteristics.

Regardless of whether balanced or unbalanced processing of $V_x$ and $V_y$ is desired, it is convenient to form the circuitry for processing the $V_x$ and $V_y$ as a hybrid circuit, mounted on the rear of the substrate bearing regions A-D. Such an arrangement serves to lower costs, reduce size and weight and improved reliability.

Circuitry similar in schematic form to that just described appears in FIG. 17 of U.S. Pat. No. 4,291,894, which also includes a description of FIG. 17 in its specification.

In some applications it may be desirable to sense only the larger or more significant of the X and Y movements. By adjusting the relative amplification of the $V_x$ and $V_y$ signals, one may be emphasized or made more significant than the other. FIG. 1 includes within the dashed lines designated I, an embodiment of a signal selection means for selecting and transmitting the larger of the amplified $V_y$ and $V_x$ signals. Through the signal selection means the larger and/or more significant of the processed $V_y$ and $V_x$ signals may be selected. First, the signals are rectified so that their absolute magnitudes may be compared and then the signal having the larger absolute magnitude is selected. The output signal from amplifier $A_1$ is applied through a resistor $R_{26}$ to the negative sense input terminal of an inverting amplifier $A_3$. The positive sense input terminal of amplifier $A_3$ is grounded. The anode of a diode $D_1$ is connected to the output terminal of amplifier $A_3$. The cathode of diode $D_1$ is connected to a feedback resistor $R_{28}$, which is also connected to the negative sensor input terminal of amplifier $A_3$, and to the positive sense input terminal of a voltage follower amplifier $A_4$. The output terminal of amplifier $A_4$ is connected to the anode of a diode $D_2$. The cathode of diode $D_2$ serves as an output terminal and is also connected to the negative sense input terminal of amplifier $A_4$.

The combination of amplifier $A_3$ and diode $D_1$ function as a rectifying means. If $V_y$ is negative, the output signal of amplifier $A_3$ is positive (because of the inverting effect $A_3$), readily passes through diode $D_1$ and is applied to the positive sense input terminal of amplifier $A_4$. If $V_y$ is positive, the output signal of amplifier $A_3$ is negative, and is blocked by diode $D_1$. Therefore, the positive $V_y$ reaches the positive sense terminal of amplifier $A_4$ through input resistor $R_{26}$ and feedback resistor $R_{28}$. That is, the circuitry insures that a positive sense signal is always present at the positive sensor input terminal of amplifier $A_4$.

Similar circuitry is provided for the $V_x$ signal comprising an input resistor $R_{30}$ to the negative sense input terminal of an inverting amplifier $A_5$ which has its positive sense input terminal grounded. The anode of a diode $D_3$ is connected to the output terminal of amplifier $A_5$. The cathode of diode $D_3$ is connected to a feedback resistor $R_{32}$ and to the positive sense input terminal of a voltage follower amplifier $A_6$. Resistor $R_{32}$ is also connected to the negative sense input terminal of amplifier $A_5$. Again, a negative sense $V_x$ passes through amplifier $A_5$ and diode $D_3$ and is applied to the positive sense input terminal of amplifier $A_6$. A positive sense $V_x$ is blocked by diode $D_3$, but passes through resistors $R_{30}$ and $R_{32}$ to the positive sense input terminal of amplifier $A_6$. That is, a positive sense signal is always applied to the positive sense input terminal of amplifier $A_6$. Also, the output signal of amplifier $A_6$ is connected to the anode of a diode $D_4$, the cathode of which serves as an output terminal and is connected to the negative sense input terminal of amplifier $A_6$. The cathodes of diodes $D_2$ and $D_4$ are connected together and at their junction form the output terminal of the signal selection means.

Through the direct feedback connections, the larger of the processed $V_x$ and $V_y$ signals causes the output signal of either amplifier $A_4$ or amplifier $A_6$ to become negative, the negative signal being blocked by either diode $D_2$ or diode $D_4$. Thus, the larger of $V_x$ and $V_y$, $V_o$, appears at the common junction of diodes $D_2$ and $D_4$. From that point, it may be desirable to connect the $V_o$ signal to a sample and hold network to store it in preparation for further processing. A sample and hold network comprises an electronic switch $SW_2$, to which $V_o$ is applied, the output of which is connected to the positive sense terminal of a voltage follower amplifier $A_7$. That positive sense terminal is shunted to ground through a capacitor $C_2$. The negative sense input terminal of amplifier $A_7$ is connected to its output terminal, at which the sampled $V_o$ signal appears.

Light source 1 is powered from a power source designated $V_1$, through a load resistor $R_L$, which limits the current flowing through the light source, the other terminal of the light source being grounded. Light sources are well known to consume relatively large currents which is undesirable in battery powered circuits because of the rapid detection of the battery. Accordingly, FIG. 1 includes an embodiment of a pulse mode or power conservation means for reducing the average power consumption of the source means. The embodiment of the pulse mode means circuitry includes a series-connected switch $SW_1$ and resistor $R_1$ interposed between power source $V_1$ and load resistor $R_L$. A grounded capacitor, $C_1$, is connected at the junction of $R_1$ and $SW_1$. A train of timing pulses, designated a chopper signal, is applied through an optional OR gate $G_1$ (the function of which is explained later herein) to switch $SW_1$ and switch $SW_2$ of the sample and hold network, closing and opening them respectively, at the beginning of each chopping pulse. When $SW_1$ closes, capacitor $C_1$ discharges causing light source 1 to emit light. At the same time, switch $SW_2$ closes connecting amplifiers $A_4$ and $A_6$ to amplifier $A_7$ and capacitor $C_2$ charges to the larger of output signals $V_x$ and $V_y$. At the end of each chopping pulse both $SW_1$ and $SW_2$ open so that capacitor $C_1$ charges again, and the larger of output signals $V_x$ and $V_y$ is stored in capacitor $C_2$. Capacitors $C_1$ and $C_2$ are selected to have sufficient capacity so that the decrease in voltage during their respective discharges is within acceptable units. Between chopper pulses, $C_1$ accumulates sufficient charge to power light source 1 when $SW_1$ is closed so as to avoid a surge of current from the power source when the next chopper pulse begins. Capacitor $C_2$ charges during a chopper pulse and maintains between chopper pulses approximately the same signal voltage at the input of amplifier $A_7$ that was present at the end of the previous pulse. That is, the source element signal and the output signal generated by the measuring means are synchronously switched into and out of operation by the pulse mode means.

The chopper signal pulse duration and interval are chosen so that the chopper pulse rate, i.e., the sample rate, has a period of not more than one-tenth of the fastest expected time variation of the quadrant signals. If signals varying no faster than 10 milliseconds over the desired range are expected, a sample rate of 1 kHz is satisfactory. A sample period of about one per cent of the sample rate yields satisfactory results. For this example, a chopper pulse duration of 5 to 10 microseconds would be satisfactory. As an example of the power savings with pulsed operation, consider a light source having an average normal current flow of 10 milliamperes. If the source is pulsed with a 5 microsecond duration pulse having a repetition rate of 1 kHz, the average current consumed by the light source is reduced to 50 microamperes. That is, the average power consumption of the light source is reduced by a factor of 200. Thus, the total power consumption of the detector and processing circuitry may be reduced to the micropower range.

Figure 2:
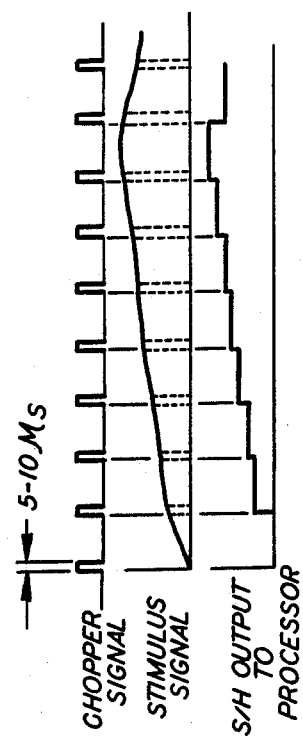
FIG. 2 is a timing diagram for pulsed detector apparatus according to an embodiment of the present invention.

In FIG. 2, timing diagrams show the effect of pulsing the detector for the embodiment and example just described. In the uppermost diagram, a chopper signal pulse train is shown. A diagram of the stimulus signal applied to the detector is shown in the middle path. The dashed lines indicate the level of the stimulus signal sampled during the chopper pulse. In the lower diagram, the sampled signal at the sample and hold network output is shown. Assuming measuring means amplifier $A_1$ is inactive when the light source is off, FIG. 2 shows the value of the stimulus signal during each chopper pulse that is sampled and stored on capacitor $C_2$ until the update provided by the next sampling interval. While the input signal to amplifier $A_3$ is therefore a series of amplitude modulated pulses, the sampling is rapid enough that no significant variations in the detected signal are missing from the sampled signal that is applied to follower amplifier $A_7$.

With the embodiment of the invention depicted in FIG. 1, the output signals of amplifiers $A_1$ and $A_2$ may not be zero as desired in the initial or static condition, when the detector elements have not yet moved with respect to each other. This imbalance is generally attributable to misalignment of light source 1, photosensor 3 and iris 5. A balancing means for nulling the output signal may include mechanical balancing means, such as adjustable mounting screws bearing on the two detector elements for aligning them with respect to each other. If the electronic components are mismatched, it may be impossible to establish a null point mechanically. In addition, mechanical alignment of two axes is difficult since adjustment of one generally affects the other. Therefore, it is desirable that the balancing means include electronic balancing means for electronically nulling the measuring means output signals. Preferably, the electronic balancing means is activated after a rough mechanical alignment of the detector elements has been achieved.

Figure 3:
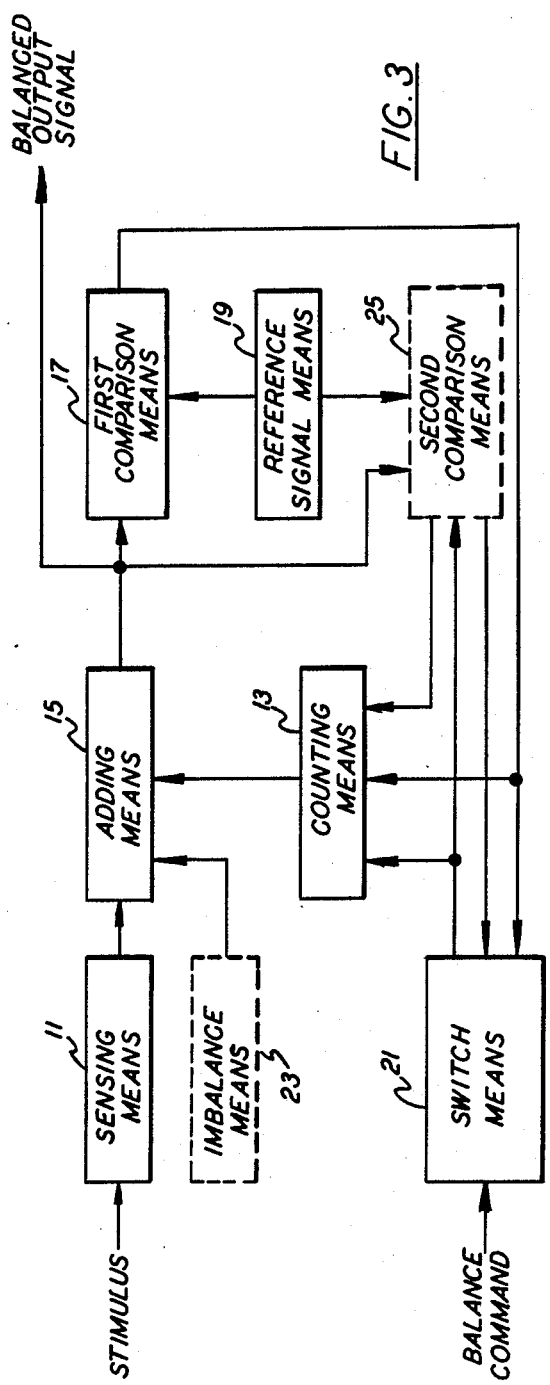
FIG. 3 is a block diagram of an electronic balancing means according to an embodiment of the present invention.

The balancing means achieves a zero or near zero output signal by adding a variable magnitude signal to the quiescent sense signal. Both signals are applied to an adding means for algebraically summing the signals to produce a summed output signal. As the magnitude of the variable signal changes, so does the summed output signal which is compared to a reference signal having a near-zero magnitude. A comparator means for comparing the magnitude of the summed output signal and the reference signal detects the variable magnitude signal source to halt its magnitude changes when the magnitude of the summed signal is sufficiently close to zero. FIG. 3 shows a block diagram of an embodiment of an electronic balancing means suitable for use with detector measuring means of FIG. 1 or with any other electronic transducing system producing an analog electrical output signal in response to a stimulus. The technique is applicable to digital systems as well if the comparison means signifying a balance condition is performed in the digital domain rather than analog domain. The electronic balancing means of FIG. 3 nulls the output signal of the measuring means or transducing system when no intended stimulus is present by adding a balancing signal to the output signal to produce a summed output signal having a near-zero magnitude. The magnitude of the balancing signal varies with time, preferably monotonically during a balancing cycle, and is preferably produced digitally.

The balancing means of FIG. 3 comprises a sensing means 11 for receiving a stimulus to be measured and converting it into an analog electrical signal, i.e., a signal having an amplitude varying in relation to the magnitude of the stimulus. Sensing means 11 may be a photosensitive detector as described in connection with FIG. 1, or any other embodiment of a detector in accordance with the present invention, a bridge circuit in which one or more of the bridge arm elements changes in electrical value in response to the stimulus, or some other analog or digital transducer. A counting means 13 produces a counting signal changing stepwise in magnitude with time, but changing in only one direction during a particular balancing cycle, which is applied to an adding means 15. In adding means 15 the sensing signal is algebraically added to the counting signal to produce a summed output signal. When no intended stimulus is present, but the output signal of sensing means 11 is not zero, the addition of the balancing signal of appropriate magnitude reduces the summed output signal to nearly zero. The summed output signal is supplied to a first comparison means 17 for comparing the magnitude of the summed output signal to the magnitude of a balance reference signal produced by a reference signal means 19. The magnitude of the balance reference signal is near zero relative to the stepwise magnitude changes in the counting signal. Preferably, the magnitude of the balance reference signal is more than that of one step, but less than that of two steps of the counting signal. During balancing, when the absolute magnitude of the summed output signal falls below the absolute magnitude of the balance reference signal, comparison means 17 disables counting means 13 so that its output signal remains steady and ends the balancing cycle by signaling a switch means 21. Application of a balancing command to switch means 21, enables the balancing means and causes a balancing cycle to begin. If counting means 13 may count only in one direction, i.e., if the magnitude of the counting signal can only increase or decrease stepwise with time, rather than sometimes increasing, sometimes decreasing, then the output signal of switch means 21 is applied to counting means 13 to reset the counting signal to zero. An optional imbalance means 23 generates an imbalance signal which is applied to adding means 15 and forms part of the summed output signal. Imbalance means 23 ensures that the summed output signal has a greater absolute magnitude than and the same polarity or sense as the balance reference signal when the counting or balance signal is reset to zero. Imbalance means 23 avoids the possibility that a false null might occur by preventing the magnitude of the sensing means signal from being less than that of the balance reference signal should those two signals have opposite polarities. If counting means 13 may count in either direction, i.e., if the magnitude of the counting signal may change stepwise either increasing or decreasing with time depending upon the state of an up-down signal supplied to the counting means, optional imbalance means 23 would not be present. Instead, a balance command applied to switch means 21 results in a switch signal being applied to and initiating a second comparison means 25 which receives the summed output signal and the balance reference signal. If the absolute magnitude of the summed output signal exceeds that of the balance reference signal in either direction, second comparison means 25 generates an up-down signal having the proper logical state to achieve a balance condition so that the up-down signal is applied to counting means 13 for establishing the direction of counting during a balance cycle so as to reduce the absolute magnitude of the summed output below that of the balance reference signal. If the absolute magnitude of the summed output signal does not exceed that of the balance reference signal, second comparison means 25 does not generate an "up" or "down" command, but rather signals switch means 21 to terminate the balancing cycle.

With a counting means 13 capable of counting in only one direction, a balance command applied to switch means 21 results in the counting signal being reset to zero. The static sensing means signal is added in adding means 15 to the imbalance signal to produce a summed output signal having a magnitude exceeding that of the balance reference signal. The counting signal begins increasing stepwise in absolute magnitude reducing the absolute magnitude of the summed output signal stepwise. When the absolute magnitude of the summed output signal falls below the absolute magnitude of the balance reference signal, comparison means 17 signals switch means 21 to reset ending the balancing cycle and halting counting means 13. The magnitude of the counting signal is then "frozen", so that the nulled summed output signal is nearly zero, relative to the magnitude of the balance reference signal.

With a counting means 13 capable of counting in either direction, a balance command to switch means 21 initiates second comparison means 25. If the absolute magnitude of the summed output signal does not exceed that of the balance reference signal, switch means 21 terminates the balancing cycle as explained before. If the balancing cycle is not terminated, the polarities of the summed output signal and of the balance reference signal are compared in second comparison means 25. As a result of that comparison an up-down signal is generated setting counting means 13 to begin increasing or decreasing stepwise the magnitude of its counting signal, beginning at the magnitude where it last stopped counting. The change in counting signal magnitude reduces or increases the magnitude of the summed output, as necessary, so that its magnitude converges toward that of the balance reference signal. For example, if the sense of the balance reference signal is negative and the summed output signal is negative, counting means 13 is triggered by the sense of the up-down signal to count in the necessary direction to increase the magnitude of the summed output signal until its absolute magnitude is less than that of the balance reference signal. Comparison means 17 signals the end of the balancing cycle, as before, freezing the magnitude of the counting signal.

Turning back to FIG. 1, the circuitry shown within the dashed lines II is an embodiment of the electronic balancing means of FIG. 3 having a single direction counting means. Balancing means circuitry is shown in FIG. 1 connected only to the $V_y$ signal circuitry, but identical circuitry would be connected to the $V_x$ signal circuitry, for independent nulling of the $V_x$ signal. Since the $V_x$ balancing means circuitry would be the same as the $V_y$ balancing circuitry, there is no need to separately depict and describe it. Likewise, one skilled in the art can apply the balancing circuitry of FIG. 1 to detectors having greater or fewer than four sensing regions.

The negative sense input terminal of a comparator $A_8$ is connected to the cathode of diode $D_1$. To the positive sense input terminal of $A_8$ is connected a variable reference signal means 7 for producing a balance reference signal $V_{BALREF}$. The output terminal of comparator $A_8$ is connected through a capacitor $C_3$ to a reset terminal $R_{FF}$ of a flip-flop $FF_1$. A grounded resistor $R_{34}$ is also connected to the flip-flop reset terminal, $C_3$ and $R_{34}$ forming a differentiator. A terminal L of flip-flop $FF_1$ receives a balance command given either manually or automatically. Flip-flop $FF_1$ normally has a low level or zero logic signal at an output terminal Q. However, when a high level or "one" logic signal appears at terminal L, the Q output switches to the high logic level and remains there until a logical one is received at reset terminal $R_{FF}$, causing a switch in the Q output to the zero state again. The Q output terminal of flip-flop $FF_1$ is connected through a capacitor $C_4$ and grounded resistor $R_{36}$, forming another differentiator, to a reset terminal $R_r$ of a digital counter 9. The same Q output terminal is connected to the enabling input terminal $E_r$ of counter 9. A clock signal is connected to a $T_r$ terminal of counter 9. At its output terminals, counter 9 produces a series of logical one and zero signals in binary code corresponding to the number to which the counting means has counted. Counter 9 begins when the input signal at terminal $E_r$ switches to a logical one and continues at the frequency of the clock signal until a logical zero is received at the enabling terminal $E_r$. In FIG. 1, a resistor network 10 functioning as a digital-to-analog signal converting means is attached to each of the output terminals of counter 9. One terminal of a resistor in network 10 is connected to each of the output terminals of counter 9 and the other terminals of the resistors in the network are connected together so that a signal corresponding to the analog sum of the binary output signals of the counter is obtained at the common terminal of the resistors. Thus counter 9 and resistor network 10 correspond to counting means 13 of FIG. 3. The analog counting signal is applied to the negative sense input terminal of a differential amplifier $A_9$. A feedback resistor $R_{38}$ couples the negative sense input terminal to the output terminal of $A_9$. An imbalance signal, $V_{REF}$, is applied to the positive sense input terminal of amplifier $A_9$. The output signal of $A_9$ is coupled through resistor $R_{40}$ to the negative sense input terminal of difference amplifier $A_1$.

Flip-flop $FF_1$ acts as a switch means enabling the electronic balancing means and resetting counting means 9. When a balance command, i.e., a logical one, is applied to the L input terminal of flip-flop $FF_1$, the output signal at terminal Q switches to a logical one enabling counter 9. The output of counter 9 is cleared to zero by the differentiated pulse that reaches reset terminal $R_r$. At the same time, the input signal to the negative sense input terminal of amplifier $A_9$ goes to zero, so that the output signal of $A_9$ becomes positive by an amount determined by the value of $V_{REF}$, the imbalance signal, and the gain of amplifier $A_9$ with feedback resistor $R_{38}$. Counter 9 begins counting upwards in response to the clock signal pulses. Amplifier $A_9$ and signal $V_{REF}$ function as the optional imbalance means insuring that initially there is an imbalance condition, i.e., a non-zero output signal of the measuring means, at the positive sense input terminal of $A_8$. ($V_{REF}$ reaches that latter point by passing through $A_1$ and $A_3$.) As counter 9 counts up, the magnitude of the counting signal, i.e., the input signal to the negative sense terminal of $A_9$, increases. Amplifier $A_9$, with resistor $R_{38}$, produces the algegraic sum of the signals applied to its input terminals, i.e., the difference of the counting signal and $V_{REF}$, a signal that decreases in magnitude with time. The algebraic sum signal is added to the imbalanced output signal of $A_1$, through $A_1$, and resistor network $R_{40}$ and $R_4$, which function as an adding means, to produce a summed output signal. Comparator $A_8$ functions as a comparison means for comparing the summed output signal (which at the negative input terminal of $A_8$ decreases in magnitude with time by virtue of being inverted by $A_3$) to $V_{BALREF}$ and for disabling counter 9 through flip-flop $FF_1$ when the magnitude of the summed output signal falls below the magnitude of $V_{BALREF}$. At that time, the output signal of $A_8$ switches from a low to a high state sending a pulse to reset terminal $R_{FF}$ of flip-flop $FF_1$. The signal at the Q output terminal then switches to a logical zero, disabling counter 9 and the balancing means, thereby "freezing" in place the signal to the negative sense input terminal of comparator $A_8$. That is, a null point balance, a summed output signal from $A_3$ having a near-zero magnitude relative to the magnitude of the balance reference signal, which is now the effective measuring means output signal, is achieved by adding the balancing signal from $A_9$ to the output signal of the measuring means. Obviously, the magnitude of $V_{REF}$ must be sufficient to cause an imbalance in the output signal of amplifier $A_1$. The magnitude of $V_{BALREF}$ is variable and is chosen to produce a null, i.e., an output signal from amplifier $A_3$ having a magnitude acceptably near zero, and is greater than one, but preferably less than the magnitude of two steps of the counting signal. The embodiment of the balancing circuitry shown has the advantage that a digital signal, less susceptible to noise than an analog signal, forms part of the null bias. Thus, the stability of the null point depends in large measure on the stability of $V_{REF}$.

It is reiterated that the electronic balancing means of FIG. 3 and the embodiment of FIG. 1 may be used for nulling output signals of any electronic sensing apparatus by producing a summed output signal. The counting signal may be capable of changing stepwise in magnitude with time or in one or both directions, but changes only in one direction during a particular balancing cycle. With a single direction counter and an imbalance means, the imbalance means must insure that upon enablement of the balancing means, the output signal to be nulled has the same polarity or sense as, and a greater absolute magnitude than, the balance reference signal. Regardless of the direction of change of the magnitude of the counting signal with time, that change must be coordinated with the polarity of the balance reference signal and with the algebraic summing of the adding means so that the adding means produces a summed output signal having an absolute magnitude approaching and eventually falling below the absolute magnitude of the balance reference signal.

Figure 4:
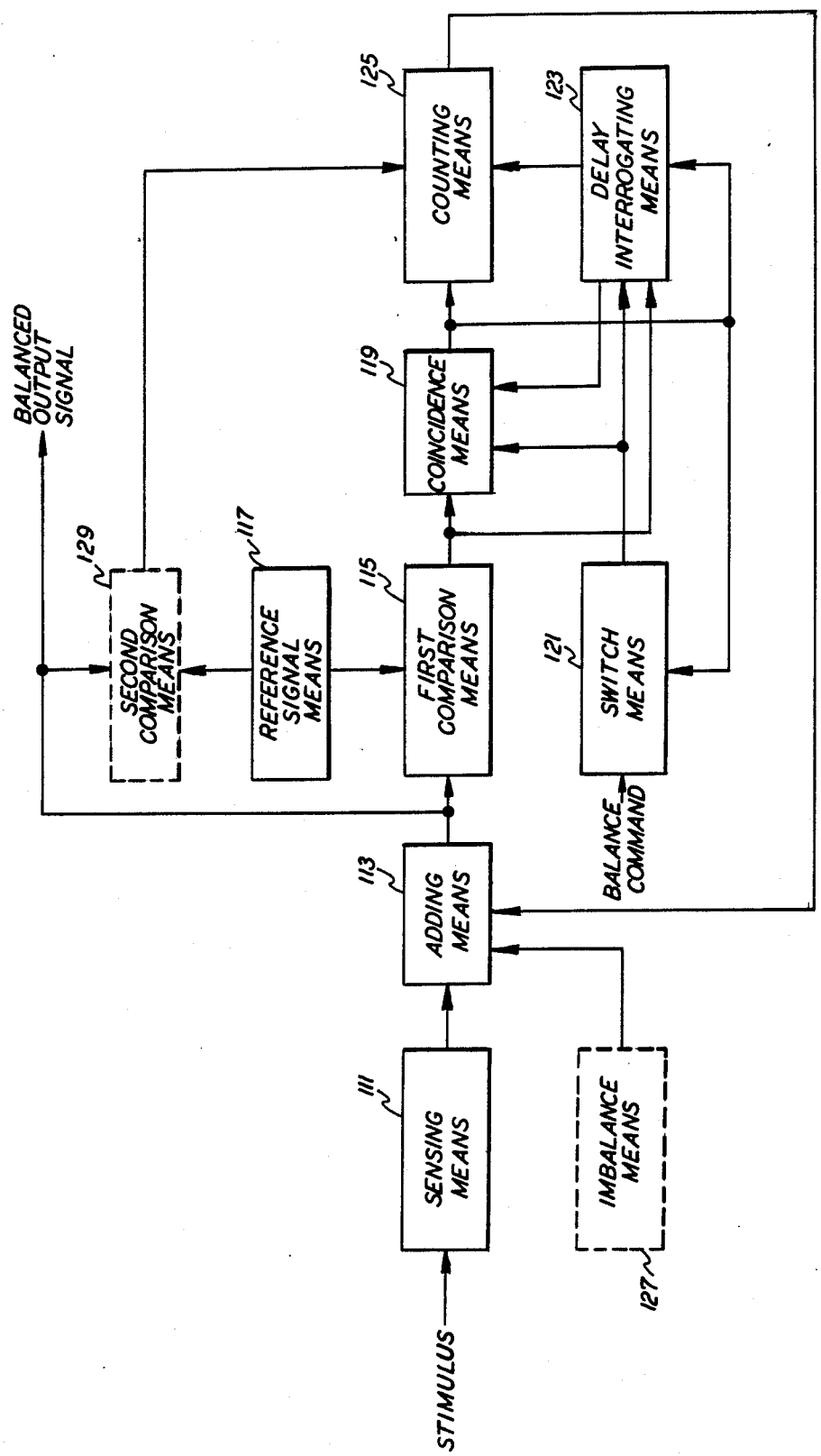
FIG. 4 is a block diagram of another electronic balancing means according to an embodiment of the present invention.

In FIG. 4, a block diagram of an alternative electronic balancing means is shown. A stimulus is applied to a sensing means or transducer 111 for producing an analog electrical signal varying in magnitude in relation to the magnitude of the stimulus. That analog signal is applied to an adding means 113 as is the balancing signal explained hereinafter. The algebraic sum of those input signals, is the summed signal that is applied to a first comparison means 115 for comparison in magnitude to a balance reference signal generated by a reference signal means 117. A coincidence means 119 receives an input signal the output signal of comparison means 115, an enabling signal from a switch means 121 and a delay signal from a delay interrogating means 123. The output signal of switch means 121, which enables the balance means, enables delay interrogating means 123. Delay interrogating means 123 establishes a delay period at the end of which, if the sensed stimulus signals have remained quiescent during the delay period, generates the delay signal. That delay signal is transmitted to a counting means 125, if that counting means may count in only one direction, for resetting that counting means. Delay interrogating means 123 also receives as an input signal the output signal of comparison means 115. The output signal of coincidence means 119 is connected to an enabling terminal of counting means 125. Counting means 125 produces a counting signal which changes stepwise in magnitude in time in one direction during a balancing cycle. The counting signal is the balancing signal which is added in adding means 113 to produce the summed output signal. The output signal of an optional imbalance means 127 is applied to adding means 113 and is part of the summed output signal if counting means 125 is capable of counting in only one direction. If counting means 125 is capable of counting either "up" or "down" depending on the logical state of an up-down signal applied to a counting means triggering terminal, imbalance means 127 would not be present and no connection between delay means 123 and counting means 125 would exist. Rather, a second comparison means 129 would receive the balance reference signal and summed output signal. The output of second comparison means 129 is connected to counting means 125 to establish the logical state of up-down signal and, therefore, the proper direction of counting so that a balance may be achieved.

A balancing cycle is commenced by the application of a balance command at switch means 121 which sends a logical one signal to one input of coincidence means 119 and activates delay interrogating means 123. Comparison means 115 provides another logical one signal to coincidence means 119 when the signal to comparison means 115 exceeds the balance reference signal. A third logical one signal necessary to commence balancing is provided by delay interrogating means 123 after a fixed delay period. With a counting means capable of counting in only one direction, that delay signal also resets the counting signal to zero. With a counting means capable of counting in either direction, the polarities of the summed output signal and balance reference signal are compared in second comparison means 129. If the absolute magnitude of the summed output signal is less than that of the balance reference signal, the signal from first comparison means 115 to coincidence means 119 never goes high and a balancing cycle is postponed. If the summed output signal magnitude is greater than that of the balance reference signal, the comparison means 129 generates an up-down signal having the proper logical state to achieve a balance condition. The up-down signal sets counting means 125 to count in the proper direction so that the counting signal causes the absolute magnitude of the summed signal to approach and eventually fall below that of the balance reference signal, ending the balancing cycle.

When the three logical ones are present at its input, coincidence means 119 enables counting means 125. The counting signal then changes stepwise in magnitude with time, either from zero, if reset, or from the previous count, if the counting means is capable of counting in either direction, changing the magnitude of the input signal to adding means 113 and, thereby, to comparison means 115. Comparison means 115 compares the absolute magnitude of the summed output signal (its input signal) to that of the balance reference signal. When the absolute magnitude of the summed output signal falls below that of the balance reference signal, marking the end of a balancing cycle, the output signal of comparison means 115 switches logical states thereby signalling coincidence means 119 to switch and disable counting means 125. As a result, the then existing magnitude of the counting signal is frozen as is the magnitude of the summed output signal. That counting signal is then the balancing signal which, when summed in adding means 113 with the quiescent sensing means signal, produces a near-zero or balanced, summed output signal for further processing. At the end of a balancing cycle, coincidence means 119 also resets switch means 121 and delay interrogating means 123.

As can be readily seen, counting means 125 can produce a stepwise increasing or decreasing magnitude counting signal so long as its ultimate effect at the output of adding means 113 is to converge the absolute magnitude of a summed signal exceeding that of the balance reference signal toward zero. The polarity or sense of the balance reference signal generated by reference signal means 117 must obviously be coordinated with the direction of change and polarity of the counting signal. The reference balance signal has a magnitude near zero relative to the stepwise changes of the counting signal, and, preferably, is greater than one, but less than two, of the counting signal steps. To ensure that there will be a convergence of the summed output signal toward zero when a counting means capable of counting in only one direction is used, it may be desirable to add optional imbalance means 127 for supplying an imbalance signal to adding means 113. Imbalance means 127 ensures that the summed output signal has, upon enablement of the balancing means, the same polarity as, and a greater absolute magnitude than, the balance reference signal to which it is compared. Thus, the counting signal will be certain to cause the summed output signal to converge, provided the proper signal polarities are observed.

The connection of the output signal of first comparison means 115 to the reset terminal of delay interrogating means 123 ensures that balancing can take place only if the sensing means signal is quiescent. Coincidence means 119 cannot enable counting means 125, i.e., initiate a balance cycle, until the delay signal is received from delay means 123. That delay signal is generated after the passage of the time interval or delay period established by delay means 123 and started when a balance command is received from switch means 121. If a reset signal reaches delay means 123 during the timing of a delay period, the timing of the period begins again, as if never begun before. If the sensing means signal changes polarity with respect to $V_{BALREF}$, i.e. changes from a magnitude below that of the balance reference signal to a magnitude above it and back again, during the delay period, the output of first comparison means 115 goes high, sending a reset signal to delay means 123, causing the timing of the delay period to begin again. In this way, coincidence means 119 is signaled on the changes in polarity and balance is repeatedly attempted until the sensing signal is quiescent, i.e. until delay means 123 is not reset during a complete prescribed delay period.

Figure 5:
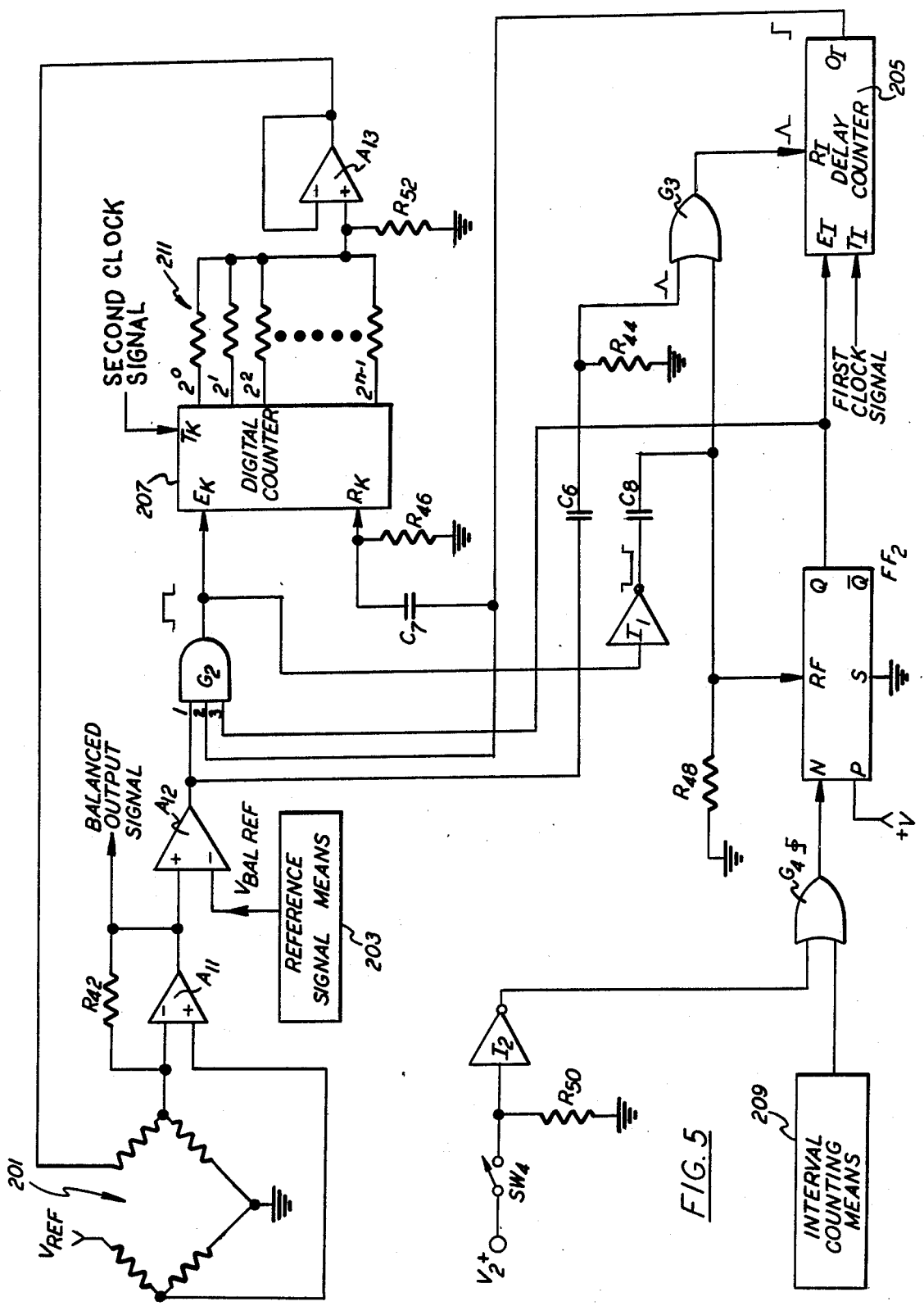
FIG. 5 is a schematic diagram of an embodiment of an electronic balancing means according to the block diagram of FIG. 4.

Turning to FIG. 5, a further embodiment of the electronic balancing means of FIG. 4 employing a counter capable of counting in a single direction is shown. The embodiment of the sensing means shown is a modified resistance Wheatstone bridge 201 having the usual opposing sensing terminals connected to the positive and negative input terminals of a difference amplifier $A_{11}$. The bridge is modified by opening one of the usual opposing power supply terminals, the other terminal being grounded in the conventional manner. To one arm at the opened connection is applied to voltage $V_{REF}$ corresponding to a stable power supply voltage and to the other arm is applied the balancing signal, the generation of which is described herein. When the bridge is balanced, i.e., when the bridge elements are matched and $V_{REF}$ equals the balancing signal, the magnitude of the output signal of $A_{11}$ is zero. But when the sensors are in their quiescent or static state, the output signal of $A_{11}$ may not be zero if the elements are not matched or one or more is being subjected to an initializing stimulus. However, by adjusting the magnitude of the balancing signal, a near-zero output signal from $A_{11}$ may be obtained, i.e., the output signal may be nulled or balanced.

FIG. 5 shows a bridge type resistive sensor merely for variety. The photosensor detector embodiment of FIG. 1 can also be used with this embodiment of the electronic balancing means. One such circuit would be used for balancing each of the $V_x$ and $V_y$ signals as explained in connection with FIG. 1. $A_{11}$ of FIG. 5 would correspond to amplifier $A_1$ of FIG. 1 and the input resistors $R_2$-$R_{10}$ of FIG. 1 would be connected to the input terminals of $A_{11}$. A feedback resistor $R_{42}$ is connected between the negative sense input terminal of $A_{11}$ and its output terminal. The output signal of amplifier $A_{11}$ is the summed output signal comprising the balancing signal and the quiescent sensor signal.

The output terminal of $A_{11}$ is connected to the positive sense input terminal of a comparator $A_{12}$ corresponding to comparison means 115 of FIG. 4. A balance reference signal, $V_{BALREF}$ generated by a reference signal means 203 is connected to the negative sense input terminal of $A_{12}$. The output terminal of $A_{12}$ is connected to the first of three input terminals of an AND Gate $G_2$ and through a capacitor $C_6$ to a resistor $R_{44}$, the opposite terminal of which is grounded. $C_6$ and $R_{44}$ form a differentiator, the ungrounded terminal of $R_{44}$ being connected to the first of two input terminals of an OR gate $G_3$. The output terminal of gate $G_3$ is connected to a resist terminal $R_I$ of a delay counter 205. The output terminal $O_I$ of delay counter 205 is connected to the second of the input terminals of gate $G_2$ and through a capacitor $C_7$ to a grounded resistor $R_{46}$, $C_7$ and $R_{46}$ forming another differentiator. The ungrounded terminal of $R_{46}$ is also connected to a reset terminal $R_k$ of a digital counter 207. The third input terminal of gate $G_2$ is connected to an output terminal Q of a flip-flop $FF_2$ and to an enabling terminal $E_I$ of delay counter 205. The output terminal of gate $G_2$ is connected to an enabling terminal $E_K$ of counter 207 and through a logic inverter $I_1$, to one terminal of a capacitor $C_8$. The other terminal of capacitor $C_8$ is connected to the second input terminal of gate $G_3$ and to a reset terminal $R_F$ of flip-flop $FF_2$. $R_F$ is grounded through resistor $R_{48}$. A switch $SW_4$, shunted to ground through a resistor $R_{50}$, is connected between the input of an inverter $I_2$ and power source $V_2$. The output terminal of $I_2$ is connected to a first input terminal of an OR gate $G_4$. An interval counting means 209 for periodically enabling the balancing means is connected to the other input terminal of a gate $G_4$, the output terminal of gate $G_4$ being connected to an enabling terminal N of flip-flop $FF_2$. When a high level signal is applied to enabling terminal N, the signal at the Q terminal goes high, until a high level signal appears at terminal $R_F$ of flip-flop $FF_2$, resetting the Q output terminal signal to the low or logical zero state. Delay counter 205 is activated by a high level Q terminal output signal which appears at input terminal $E_I$. The delay counter then counts for a specified delay period, producing a high level delay signal at terminal $O_I$, if no reset signal is received at terminal $R_I$ during the delay period. If a reset signal is received, the timing of the delay period begins again, as if a high level signal had just arrived at terminal $E_I$. Delay counter 205 determines the delay period by counting pulses provided at an input terminal $T_I$ by a first clock signal, the conventional source of which is not shown. Delay counter 205 provides a means for timing the length of a fixed period and signaling the arrival of the end of that period unless the timing is interrupted, in which case the timing of the period starts over.

Counter 207 produces signals in binary code at its output terminals corresponding to the number of counting intervals which have passed since the counting began. Counting begins when a high level signal is applied to enabling terminal $E_k$ and the total count is reset to zero when a pulse arrives at reset terminal $R_k$. Counting is synchronous with a second clock signal, the conventional source of which is not shown, applied to a timing terminal $T_k$. One terminal of each of a network of resistors 211 is connected to each of the output terminals of counter 207 and the other ends of the resistors are commonly connected. Resistors 211 function as a digital-to-analog signal converting means producing a signal having a magnitude that is the analog sum of the binary count. That is, counter 207 along with resistor network 211 comprise a counting means corresponding to counting means 125 of FIG. 4. The common connection of a resistor network 211 is connected to the positive sense input terminal of a voltage follower amplifier $A_{13}$ which is grounded through resistor $R_{52}$. The negative sense input terminal of $A_{13}$ is connected to the putout terminal of $A_{13}$. Resistor $R_{52}$ provides the summing junction for ladder network 211. The output of amplifier $A_{13}$ is the balancing signal which is connected to one of the opened arms of bridge 201 as earlier explained, or through a load resistor to the negative sense input terminal of $A_{11}$ if the circuit is used with a detector, such as the quadrant detector of FIG. 1.

A balancing cycle is initiated by applying a balancing command to flip-flop $FF_2$. The command can come either from the opening of switch $SW_4$ disconnecting the power source from inverter $I_2$ or from a pulse generated by interval counting means 209. A pulse from either of these sources results in a high signal at input N of flip-flop $FF_2$. Flip-flop $FF_2$ then acts as the switch means 121 of FIG. 4 enabling the electronic balance means by sending a high signal to the enabling terminal $E_I$ of delay counter 205 and to the third terminal AND gate $G_2$. AND Gate $G_2$ acts as coincidence means 119 of FIG. 4 enabling counter 207, when the balancing means is enabled, when the delay signal is generated by delay counter 205 and when the summed output signal, i.e., the input signal to comparator $A_{12}$, has a magnitude exceeding the magnitude of the balance reference signal. The enablement of delay counter 205 causes it to begin the timing of a delay period, at the end of which a high level signal appears at its output terminal $O_I$ and at the second terminal of AND gate $G_2$. The switch of the signal at $O_I$ to the high level also resets the output of counter 207 to zero causing an imbalance condition, i.e., a high level signal appears at the output of comparator $A_{12}$ and therefore at the first input terminal of gate $G_2$. That is, delay counter 205, when enabled by flip-flop $FF_2$, acts at the end of an uninterrupted delay period to reset counter 207 to zero and to enable one input gate $G_2$. The resetting of the counting signal to zero causes the output signal of $A_{11}$ to become positive as a result of the presence of $V_{REF}$, thereby switching the output signal of comparator $A_{12}$ to the high level and placing a high level signal at the first input terminal of gate $G_2$. Gate $G_2$, when enabled by the coincidence of three high level signals at its input terminals, enables counter 207 which begins generating an increasing digital counting signal, the analog equivalent of which is the balancing signal appearing as the output signal of $A_{13}$. That increasing balancing signal causes the signal at the positive sense input terminal of comparator $A_{12}$ to decrease. When that input signal falls below the magnitude of $V_{BALREF}$, the output signal of $A_{12}$ switches from high to low, switching the output of gate $G_2$ to the low state and thereby disabling counter 207, through terminal $E_k$, from changing its output signal. That is, the magnitude of the balancing signal is frozen and the summed output signal is nulled, i.e., its magnitude is less than $V_{BALREF}$. The counting or balancing signal, $V_{REF}$ and the static sensor signal are all algebraically added through $A_{11}$ acting as an adding means to produce the summed output signal, i.e., now the balanced or nulled output signal. The transition in the output signal of gate $G_2$ is inverted by inverter $I_1$ and passed through to terminal $R_F$ of flip-flop $FF_2$, resetting it in preparation for receiving the next balance command. The reset causes the output signal at the Q output terminal of $FF_2$ to drop to the low state disabling delay counter 205. The same signal passes through gate $G_3$ to reset delay counter 205 through its reset terminal $R_I$.

If during the timing of a delay period by delay counter 205 following a balance command, the sensing means, in whatever form it may be, changes polarity with respect to $V_{BALREF}$, i.e. generates at $A_{11}$ a signal first falling below and then exceeding $V_{BALREF}$ in magnitude, the sensor signal is not quiescent and balancing would be inappropriate. In that case, the output signal of $A_{12}$ momentarily goes high when $V_{BALREF}$ is exceeded and a differentiated pulse reaches and resets delay counter reset terminal $R_I$ via gate $G_3$. Then the timing of the delay period begins again. Thus, this embodiment of the electronic balancing means insures that the sensed signal is quiescent or static by sampling it for the delay period before attempting to null the summed output signal from $A_{11}$.

With the balancing means embodiment of FIGS. 5, $V_{REF}$ ensures that when the balancing signal falls to zero, the magnitude of the output signal of $A_{11}$ will be of the same polarity and greater magnitude than $V_{BALREF}$. That is, $V_{REF}$ and part of the sensing means act as an imbalance means producing an imbalance signal insuring that the summed output signal upon enablement of the balancing means has the same polarity and a greater magnitude than the balance reference signal. If this balancing means embodiment is used with the photosensor detector embodiment of FIG. 1 as a sensing means, an optional imbalance means would be added as already explained for that embodiment. That is, an imbalance source $V_{REF}$ would be supplied, independent of the sensing means, to $A_{11}$ to insure the initial imbalance.

The embodiment of FIG. 5 provides for either manual enablement of the electronic balancing means by the opening of $SW_4$ or by periodic automatic enablement whenever interval counter 209 emits a pulse. It is intended that a balance cycle be activated as frequently as necessary to compensate for component value drift considering the environment in which the circuit is used, either manually, or in default of that, automatically.

Again, with the alternative electronic balancing means, as with the first described, it is important to observe polarities of the imbalance signal and the direction of change of the counting signal. It is intended that the counting signal reduce the absolute magnitude of the summed output signal to below the absolute magnitude of the balance reference signal at which point a nulled or balanced summed output signal is achieved.

If both a pulse mode, i.e., power-conserving, means and electronic balancing means are used, as in the inventive embodiments of FIG. 1, their operations must be coordinated to obtain the desired results. Either the chopper pulses and clock signal pulses driving the counting means must be synchronized so that balancing may be completed during the "on" time of one chopper pulse or the chopper pulses must be disabled during balancing to ensure the operations of the source means during the entire balancing cycle. As is conventional, it is expected that the clock signal and chopper signal would be derived from the same timing oscillator. With a typical clock signal frequency of 10 MHz and a four bit digital counter as a counting means, a full cycle of counting (0 to 15) would take 16 cycles or 1.6 microseconds. Thus, balancing could easily be achieved during a single 5 microsecond sampling pulse provided the balancing cycle does not begin too early or end too late with respect to sampling pulse timing.

Turning again to FIG. 1, there is there shown a means of coordinating the timing of chopper pluses and the balancing cycle. To ensure that there is no interference from the timing of the pulses, the enabling signal to counter 9 and the chopper signal are connected to separate input terminals of an OR gate $G_1$, interposed in the electrical line for the activation of switches $SW_1$ and $SW_2$ by the chopper pulses. Thus, during a balancing cycle when the enabling signal to counter 9 goes high, so does the output signal of $G_1$, closing switches $SW_1$ and $SW_2$. That is, operation of light source 1 during balancing is ensured. The presence of gate $G_1$ does not interfere with sampling when balancing is not taking place since a "high" chopper signal means a high $G_1$ output signal operating $SW_1$ and $SW_2$ as described before. With the electronic balancing means of FIG. 5 applied to the detector embodiment and associated circuitry of FIG. 1, the enabling signal to be applied to gate $G_1$, along with the chopper signal, would be taken from the output of AND Gate $G_2$.

To reduce the power consumption of the timing oscillator, it is desirable to reduce the clock signal frequency. However, with the power conserving means of FIG. 1, if the maximum balancing time (16 times the period of the clock signal when a four bit counter is used as the counting means) approaches or exceeds the sampling time, the capacity of capacitor $C_1$ based on the sampling time will be insufficient to provide an essentially uniform source of current to light source 1 during the entire balancing cycle. For example, if the clock signal frequency is 33 KHz, corresponding to a 30 microsecond period for each counter increment, a balancing cycle with a four bit counter could be nearly ½ millisecond long. Either $C_1$ will have to be greatly increased in capacity or additional current furnished to light source 1 during balancing to accomodate this situation. The latter solution can be achieved by placing a switch $SW_3$ in parallel with resistor $R_1$. With the electronic balancing means embodiment of FIG. 1, switch $SW_3$, like gate $G_1$, is connected to the enabling terminal of counting means so that $SW_3$ is closed during the balancing cycle. With the electronic balancing means embodiment of FIG. 5, $SW_3$ would be closed when the output signal of gate $G_2$ is high. As a result, the current provided to light source 1 during balancing is uniform and slightly increased over the flow during sensing operations of the circuitry. That increased current flow is so brief (e.g., ½ millisecond) that no material increase in overall power consumption results from the longer balancing cycle with the lower clock signal frequency.

One application of the photosensor detector embodiment and of the other embodiments of the detector described herein is in an electronic safety ski binding. As described in my U.S. Pat. No. 4,291,894, the function of a safety ski binding is to sense during skiing the presence of forces on a skier's foot, leg and boot, and to release the ski from the boot when those forces reach dangerous levels so as to avoid injury to the skier. Safety bindings therefore have a latching condition in which the binding is firmly locked to a skier's boot and a releasing condition in which the binding is released from the boot. Mechanical safety bindings are known in the art, but electronic safety bindings having electrical force sensing and electronic processing of electrical force signals to trigger binding release, provide significant advantages as further described in U.S. Pat. No. 4,291,894.

Figure 6:
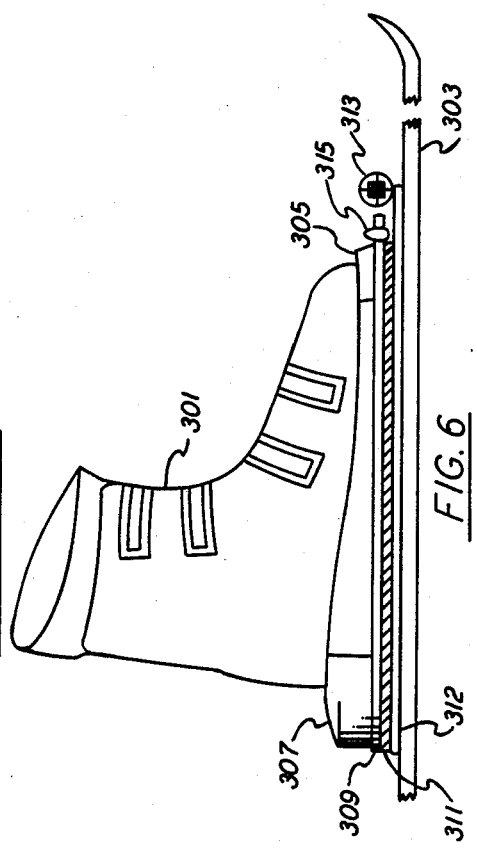
FIG. 6 is a schematic side view of various embodiments of a detector according to the present invention incorporated into a safety ski binding.

Turning to FIG. 6, there is shown in highly schematic form a side view of a ski boot 301 held on a ski 303 by safety ski binding including toe and heel boot releasing latches 305 and 307, respectively. The sole of boot 301 is received by and clamped to a sole plate 309 rigidly affixed to an elastic spacing means 311. A rigid ski plate 312 is affixed to elastic spacing means 311 opposite sole plate 309 and is firmly attached to ski 303. A detector sensing means including sensing element 313 is rigidly mounted to ski plate 312, and a detector source means including source element 315 is rigidly mounted to sole plate 309. Of course, the relative locations on ski and boot of the source and sensing means may be interchanged. In the photosensor detector embodiment of FIG. 1, sensing element 313 may correspond to photosensor 3 and source element 315 may correspond to light source 1. Not shown in FIG. 6 are the circuitry and power source previously described, the signal processing circuitry and interconnected release triggering mechanism for releasing the ski from the boot or the housing to protect the detector. Embodiments of such circuitry and mechanisms are described above and in my U.S. Pat. No. 4,291,894. During skiing, various forces are exerted on the ski boot as a result of turns, accelerations, decelerations, bumps, etc. In the embodiment of FIG. 6, the forces between the ski and the skier's leg cause movement of boot 301 and sole plate 309 with respect to ski 303. Elastic spacing means 309, which may be a pad of an elastomeric material such as rubber or another resilient material, or a mechanical spring means, allows relative movement between the ski and boot in response to forces encountered during skiing, i.e., elastic spacing means 309 functions as a multidimensional spring. The relative movements of ski and boot are related to the forces between the ski and skier's leg so that in the ski binding application, the detector functions as a force sensor. If the detector embodiment is a four region detector of the type described in reference to FIG. 1, the detector sensing element 313 may be mounted with the boundary between two of the regions generally parallel to the skiing surface of the ski. In that configuration, torques twisting a skier's leg will generate changes in $V_x$ signals. Likewise, in that configuration, forces which tend to tip the skier in the direction of, or opposite to the direction of, travel of the ski will generate changes in $V_y$ signals.

It will be appreciated that in practice the sensing and source elements are covered by a housing to avoid fouling and damage to them. In skiing, the maximum risetime of any skiergenerated forces is about 10 milliseconds. Therefore, the examples given above for the embodiment of FIG. 1 and its pulsed mode operation with 5 to 10 and 30 microsecond sampling times are full applicable to a safety ski binding incorporating a pulsed operation detector. It has been found practical in a ski binding employing a four region detector to emphasize one detected force signal over the other and to process only the larger of the post-emphasized force signals for consideration in making a release or non-release decision. Therefore, it is preferred in the application of the detector invention to a safety ski binding to use a signal selection means, such as the embodiment described and shown in FIG. 1 within the dashed lines designated I.

From time to time, the detector circuitry in a ski binding must be rebalanced and it is preferable to rebalance more often than absolutely necessary to avoid any possible accumulation of small imbalances. However, balancing is generally not required more than once or twice during a week of skiing. A balance command is preferably given manually or automatically at intervals when the sensed forces return to essentially the static condition. Any of the electronic balancing means previously described may be satisfactorily used in an electronic safety ski binding. With the embodiment of the balancing means shown in FIG. 5 applied to a ski binding, switch $SW_4$ comprises an activation means for applying a balance command. Preferably the activation means is triggered when a ski boot is removed from a binding incorporating the detector, assuring a rebalance at least once during each day of skiing. In this situation, there is no sensor signal attributable to the skier's weight or to skiing forces. Further, interval counter 209 preferably emits a pulse about once every 16 days to insure that a balance condition is maintained even while the electronic binding is not in use. Otherwise, when a binding is first clamped onto a boot, a skier might start out with a measuring means that had become imbalanced through normal aging of the electronic and mechanical systems of the binding. While the interval counter arrangement requires power be perpetually applied to the binding, the total power consumption of the preferred detector and preferred CMOS circuitry is extremely small. The delay period for the electronic balancing means of FIG. 5 in a ski binding application is preferably about three seconds. That delay period prevents a balancing cycle from beginning when a ski is bouncing after a release during skiing or when a skier first steps out of the binding. Rather, balancing is postponed until the sensed forces or impacts of the ski appearing as forces disappear for at least the delay period.

The detector is not limited to light as source means and photosensors as sensing means, just as it is not limited to four sensing regions or devices. In FIG. 7A a capacitive embodiment 401 of a four region version of the detector is depicted. Four mutually electrically isolated regions or capacitor plates A, B, C and D are contiguous on a non-conductive substrate 403. Each area is metallic or formed of some high conductivity material forming one plate of a capacitor. In FIG. 7A each plate covers one quarter of substrate 403. Substrate 403 is separated by a dielectric 405 from a second non-conducting substrate 407 containing as a source element a conductive area 409, generally square in shape and smaller in area than the combined areas of plate A-D. Area 409, the "shadow" of which is shown as a cross hatched area on plates. A-D to indicate the intended mechanical alignment, forms a second plate of the capacitor, that plate being common to all of plates A-D. When substrates 403 and 407 are mounted so that plates A-D and plate 409 are aligned in opposing relationship, an embodiment of a capacitive detector including four capacitors is formed. When one of the substrates moves in its plane with respect to the other, the mutual plate area of at least one of the capacitors is reduced, reducing its capacitance. Measurement of changes in the individual capacitances through leads connected to the common plate and to each of plates A-D allows a determination of the direction and magnitude of the relative movements of the plates in planes containing them. In order to obtain the largest capacitance and largest capacitance changes, it is preferred that the plates have as large an area as a particular installation permits and that the dielectric separating substrates 403 and 407 be as thin as possible, yet have a low coefficient of friction to all movement of the plates. Although the dielectric may be air, it is preferred that a material with a higher dielectric constant be inserted between the plates. TEFLON is one material that is suitable as a dielectric in a capacitive embodiment of the detector since it has a low coefficient of friction and a relative dielectric constant of about 2.

When the dielectric is air, the capacitive plates may also move so as to widen and narrow the separation between them. By measuring the sum of capacitances A-D, relative motion generally perpendicular to substrates 403 and 407 may be detected and measured, at the same time that relative motions in the planes of the substrate are measured. That is, embodiment of the detector shown in FIG. 7A may be used to detect three dimensional movements.

Figure 7B:
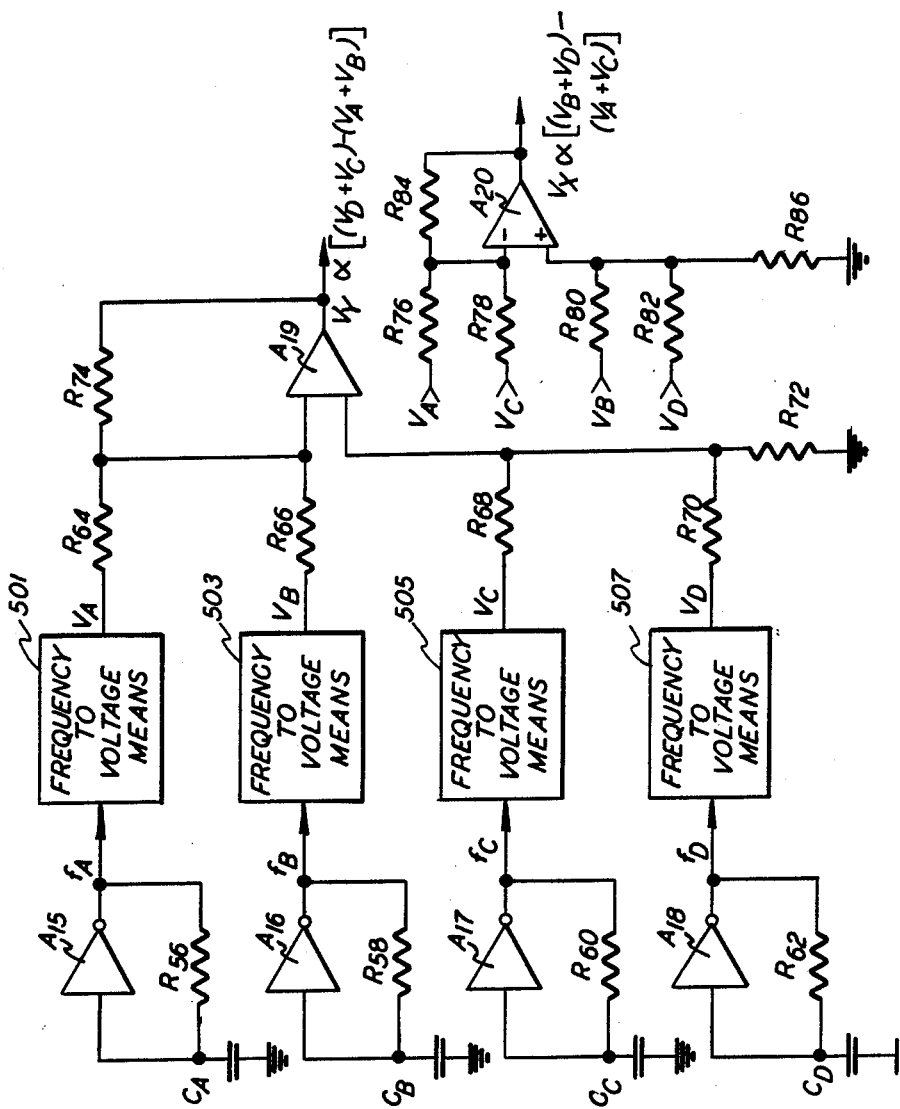
FIG. 7B is a schematic diagram of circuitry for use with a capacitive dual axis detector according to an embodiment of the present invention.
Figure 7A:
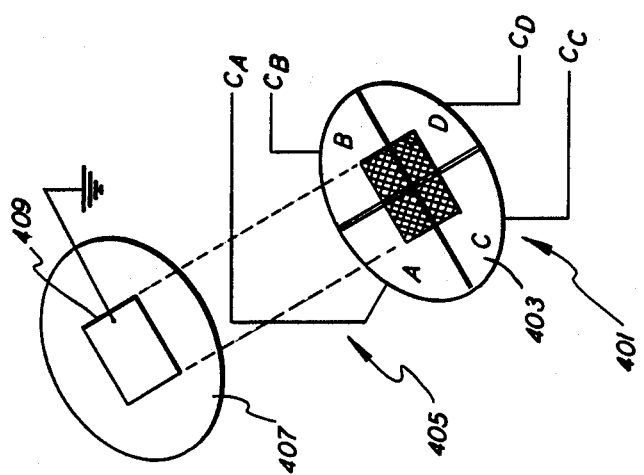
FIG. 7A is a schematic diagram of an embodiment of a capacitive dual axis detector according to the present invention.

In FIG. 7B a simplified embodiment of a measuring means for a capacitive four region detector measuring two dimensional motions is shown. It is desirable to add conventional temperature compensation circuitry, such as temperature sensitive resistors or more complex circuitry including additional inverters, to stabilize the operation of the circuitry. Since such circuitry will be obvious to one skilled in the art, there is no need to depict and describe it. As indicated in FIG. 7A, each plate has a corresponding capacitance associated with its, plate A has capacitance $C_A$, plate B has capacitance $C_B$, etc. In the circuitry shown in FIG. 7B, each of those capacitances is used to determined the repetition rate of a pulse train generating oscillator comprised of an inverter with a feedback resistor connected between its output and input terminals, and with a varying capacitor connected to the inverter input terminal. For example, the ungrounded lead of capacitor $C_A$ is connected to the input of inverter $A_{15}$ which has a feedback resistor $R_{56}$ connected between its input and output terminals. The output signal is a train of pulses having substantially equal "on" and "off" times and a cycle period of $t_A$, i.e., a frequency $f_A = 1/t_A$, is generated. Typical conventionally available CMOS inverters have fixed positive and negative voltage trigger points, $V_p$ and $V_n$, respectively, at which the output voltage switches from high to low and low to high. The period of a pulse train produced by an oscillator employing such an inverter with input capacitance $C_A$ and feedback resistance $R_{56}$, is described by $$t_A = R_{56}C_A \ln \left[ \frac{V_p}{V_n} \cdot \frac{V_{DD} - V_n}{V_{DD} - V_p} \right]$$

The terms are as already defined, except that $V_{DD}$ (not shown) is the power supply voltage, a constant, to the system. Thus, the period and frequency of the pulse train are linearly related to the capacitances. Similarly, other oscillators generate pulse trains having periods $t_B$, $t_C$ and $t_D$ which are measures of $C_B$, $C_C$ and $C_D$, respectively. Measuring means oscillators might generate analog output signals tuned in frequency by capacitances $C_A$, $C_B$, and $C_C$ and $C_D$, but pulse train oscillators are preferred since greater precision in measuring frequency changes can be achieved.

It is preferred that all capacitances have the same value in the quiescent or static state of the detector or at least that $t_A = t_B = t_C = t_D$ in the quiescent state. This equality can be substantially achieved by matching the capacitor plates, such as by preparing the plates simultaneously by vapor deposition and etching or other conventional film and integrated circuit fabrication techniques, by precise alignment of the first plates and common plate in a particular installation and/or by adjusting the values of the feedback resistors $R_{56}$-$R_{62}$ as a means of electronically balancing the system in its quiescent state. Of course, the four capacitor plates could be prepared independently and then united on a single element.

For further processing it is convenient to convert the pulse trains having repetition rate frequencies $f_A$-$f_D$ into voltages having magnitudes determined by the frequency. The conversion is accomplished by a frequency-to-voltage means, such as means 501 which is connected to the output terminal of inverter $A_{15}$. Frequency-to-voltage means 501 may be, for example, any conventional frequency modulation detector. Frequency-to-voltage means 501 converts frequency $f_A$ to voltage $V_A$. Similarly, means 503, 505 and 507 convert frequencies $f_B$, $f_C$ and $f_D$ to voltages $V_B$, $V_C$ and $V_D$, respectively. These voltages may then be combined in pairs by circuitry identical to that depicted to FIG. 1 and described in connection therewith, to generate voltages $V_x$ and $V_y$, indicated relative movements of the detector elements along the X and Y axes, respectively. For example, signals $V_A$ and $V_B$ are applied through input resistors $R_{64}$ and $R_{66}$, respectively, to the negative sense input terminal of a difference amplifier $A_{19}$. Signals $V_C$ and $V_D$ are applied through input resistors $R_{68}$ and $R_{70}$, respectively, to the positive sense input terminal of $A_{19}$, which is grounded through resistor $R_{72}$. Feedback resistor $R_{74}$ connects the output terminal of $A_{19}$ with its negative sense input terminal. Thus, a signal, $V_y$, proportional to $[(V_D+V_C)-(V_A+V_B)]$, appears at the output terminal of $A_{19}$. Similarly, $V_x$, proportional to $[(V_B+B_D)-(V_A+V_C)]$, is generated by a difference amplifier $A_{20}$ with input resistors $R_{76}$ through $R_{82}$, feedback resistor $R_{84}$ and resistor $R_{86}$ from the positive sense input terminal to ground. Amplifiers $A_{19}$ and $A_{20}$ are entirely analogous to amplifiers $A_1$ and $A_2$, respectively, of FIG. 1.

Balancing means may be provided to balance the capacitive embodiment of the detector in its static state. The embodiments of an electronic balancing means shown in FIGS. 1 and 5 are directly usable with the capacitive detector circuitry shown in FIG. 7B, as is the embodiment of the signal selection means shown in the dashed lines designated II in FIG. 1.

Figure 7C:
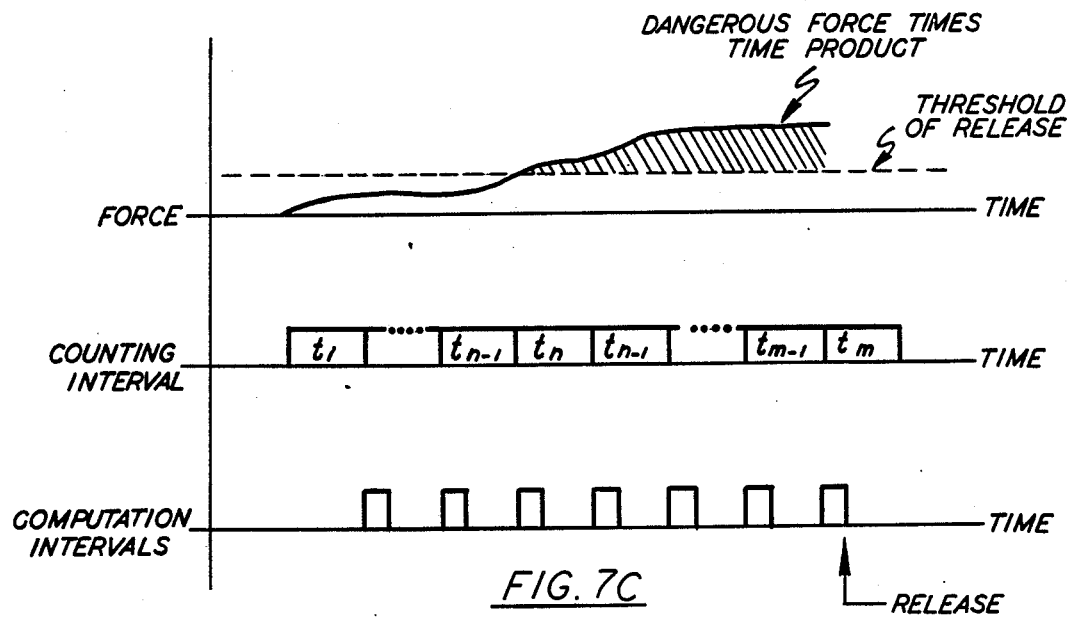
FIG. 7C is a timing diagram for one embodiment of processing circuitry that may be used with a capacitive embodiment of the detector according to the present invention.

As an alternative means of processing the pulse trains generated by the oscillators of FIG. 7B, the pulses generated could be applied directly to digital counters for counting and summing. Further processing may be used to determine the relative motion of the detector elements. FIG. 7C shows a timing diagram for one such technique for a ski binding application. The force experienced over time on a skier's leg is shown in the uppermost graph. The cumulative effect of an excessive level of force on a skier's leg is indicated by the shaded area under the curve. In the middle graph, the timing of a series of continuous "counting" intervals is shown. In the lower graph, the relative timing of "calculation" intervals, following the counting intervals, is shown. The pulse counters may be discrete or part of a microprocessor. Pulses from each oscillator may be counted by separate counters or, preferably, a single multiplexed counter may be used with serial access for each oscillator. During each of the counting intervals, pulses are counted for each oscillator, either in series or parallel, depending on whether multiplexing is used. The counting periods must be much shorter than the period for response, which for a ski binding application is about 10 milliseconds. For such an application, the duration of the counting periods could be about 100 to 500 microseconds. The counted number of pulses is stored. At the end of each counting interval, and preferably during the beginning portion of the subsequent counting interval, a calculation interval runs, as shown in the middle diagram of FIG. 7C. During each calculation interval the pulse counts for each sensor accumulated during the preceding counting interval may be appropriately combined. For a four region detector, for example, the sum of pulse counts for regions A and B might be subtracted from the sum of the counts for C and D, much in the fashion used to calculate motion with the embodiment of FIG. 1. When the cumulative sum of counts, approximately combined, exceeds a predetermined threshold indicating the presence of a dangerous force over an unacceptably long time, a release signal is generated as schematically indicated at the right in FIG. 7C. A microprocessor using such a technique may also include a large capacity memory that can vary the parameters of the release decision depending on skier skill, snow conditions, terrain, etc. In addition, automatic balancing of such a system may be accomplished by subtracting the quiescent pulse counts for each oscillator from the count accumulated during the counting period.

Figure 8A:
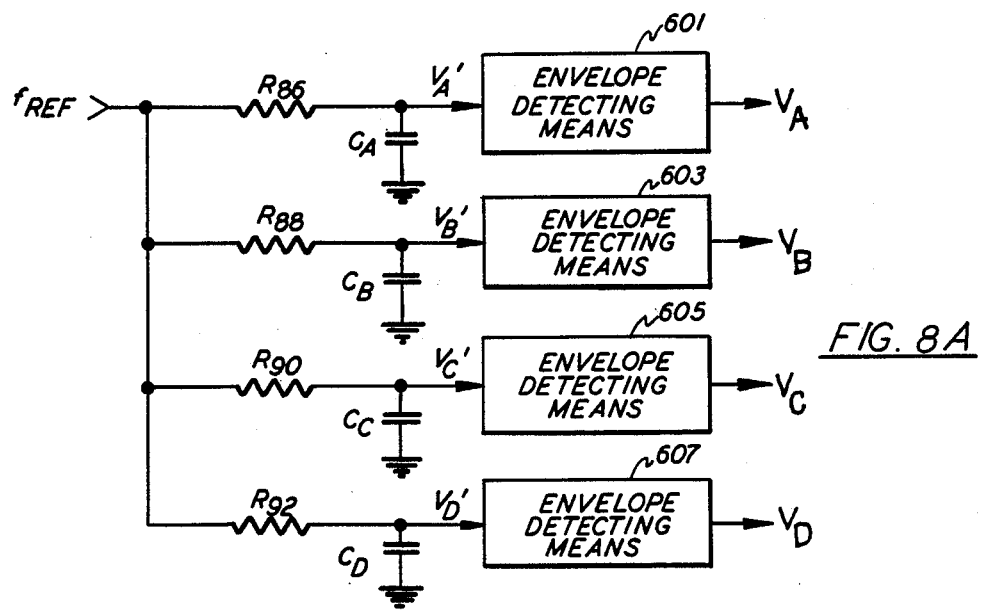
FIG. 8A is a schematic diagram of an alternative embodiment of circuitry for use with a capacitive detector.

FIG. 8A shows an alternative embodiment of a measuring means for producing signals reflecting relative movements of the plates of a capacitive embodiment of the detector. There, a reference frequency signal, $f_{REF}$, generated by a stable frequency oscillator (not shown) is applied to each of four passive low-pass filters, each including a series-connected resistor and a parallel connected grounded capacitor. Each capacitor is one of the detector plate capacitors. For example, the filter shown in the uppermost part of FIG. 8A comprises a resistor $R_{86}$ and a capacitor $C_A$, the capacitor formed by plate A and the common plate. The signal appearing at the output of this filter has an amplitude $V_A$ (which is less than the amplitude of the input to the filter because the filter elements are selected so that the cut-off frequency is exceeded) and a frequency $f_{REF}$. Similarly, the other filters are formed with the other capacitors of the detector. The filter elements are chosen so that each filter has substantially the same cut-off frequency and the reference frequency is chosen to be above that cutoff frequency. An envelope detecting means 601 is connected to the output of the $R_{86}$, $C_A$ filter. Similarly, envelope detecting means 603, 605 and 607 are connected to the filters containing capacitors $C_B$, $C_C$ and $C_D$, respectively. The outputs $V_A$-$V_D$ of means 601-607 correspond to the outputs $V_A$-$V_D$ in FIG. 7B.

Figure 8B:
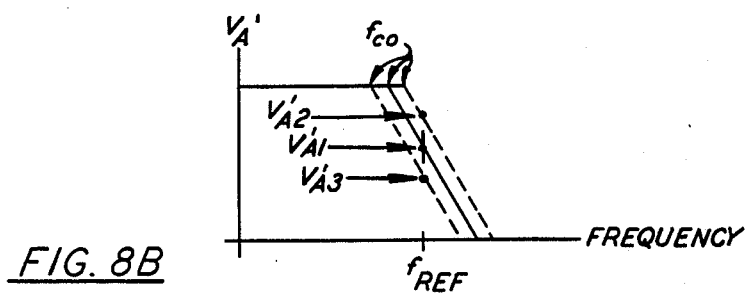
FIG. 8B is a response diagram of a low-pass filter such use in the circuitry embodiment of FIG. 8A.

FIG. 8B illustrates the linearized attenuation characteristic of a low-pass filter. At frequencies above the cut-off frequency $f_c$, the attenuation of the signal by the filter varies relatively rapidly with frequency. Thus, at the reference frequency, the output voltage from the filter containing $C_A$ is $V'_{A1}$. But when the value of $C_A$ changes as the elements of the capacitive detector embodiment move relative to each other, the cut-off frequency of the filter changes shifting the response curve as suggested in FIG. 8B by the dashed lines. An increase in capacitance causes a decrease in the cut-off frequency and vice versa. As a result, instead of $V'_{A1}$ a different voltage, for example, $V'_{A2}$ or $V'_{A3}$, is generated reflecting the movement and capacitance change. Since the filter output signals have fluctuating amplitudes, envelope detection means are used to demodulate the sensed information for further processing. These demodulated signals may be processed in the same manner as explained in connection with FIGS. 1 and 7 to generate $V_x$ and $V_y$ signals. Likewise, signal selection means and electronic balancing means can be used with the embodiment of detection circuitry shown in FIG. 8A.

Both the circuits of FIGS. 7B and 8A can be operated in a pulsed mode to reduce power consumption. However, there is little need for pulsed operation with a capacitive embodiment of a detector as compared with the photosensor embodiment, since the source means of the former does not consume a significant amount of power. For example, a capacitive detector with CMOS processing circuitry in a ski binding application can be operated with a power consumption of less than 200 microwatts. The capacitive embodiment of the detector is particularly advantageously used with processing circuits such as are shown in FIGS. 7 and 8, because frequency dependent circuits lend themselves to easier realization with current CMOS technology than do amplitude dependent circuits. For those reasons, the capacitive detector embodiment is the most preferred detector for use in an electronic safety ski binding.

The capacitive embodiment of a detector can be used in a ski binding just as described in connection with the photosensor embodiment of the detector. Referring again to FIG. 6, 315 represents the common plate of the capacitive detector and 313 the plate containing the quadrants. Of course, the relative positions of the detector elements may be interchanged. The description of the use of the photosensor embodiment of the detector in a ski binding is fully applicable to use of a capacitive embodiment and therefore it is unnecessary to repeat it.

Figures 9A, 9B:
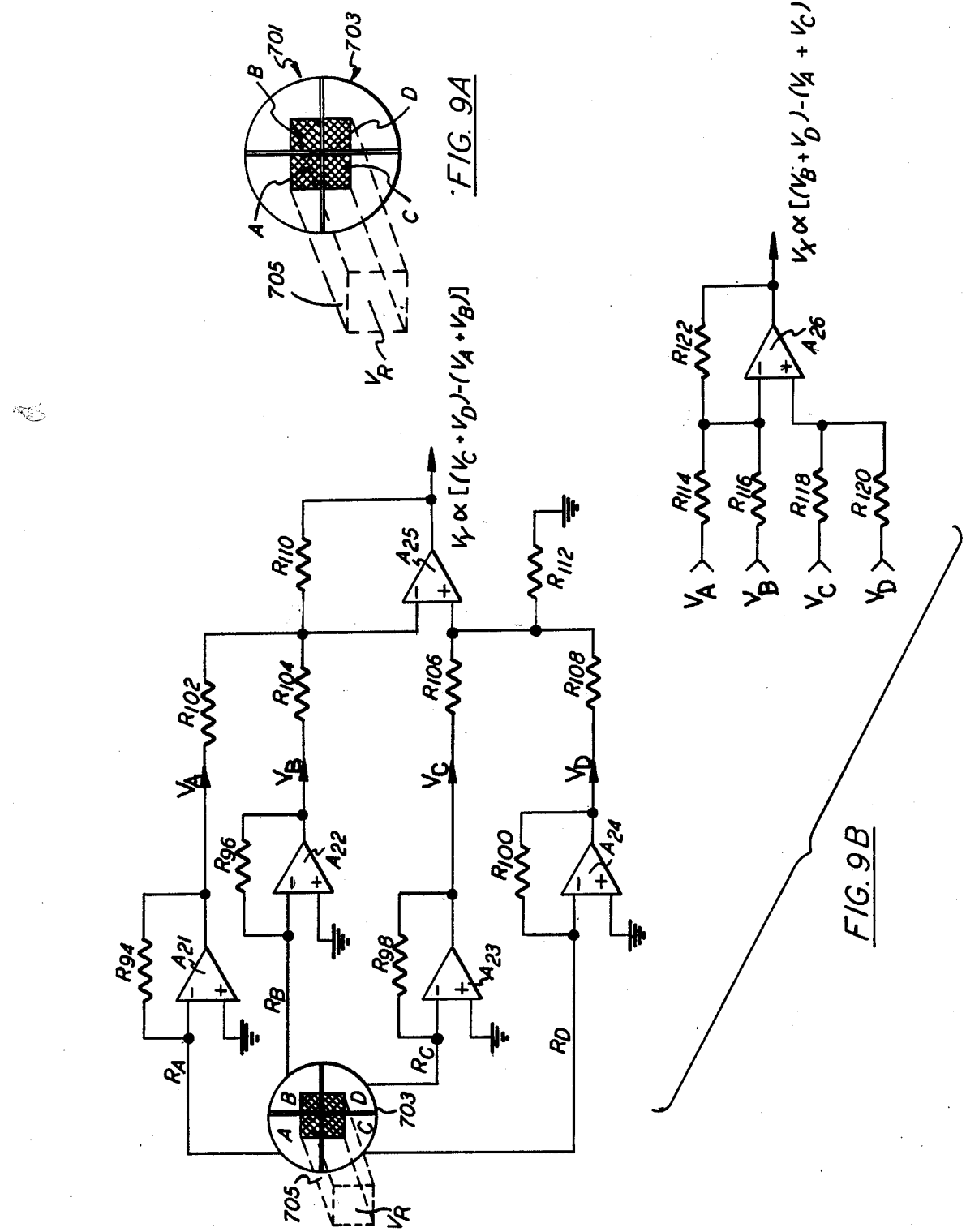
FIG. 9A is a schematic diagram of a dual axis resistive detector according to an embodiment of the present invention.
FIG. 9B is a schematic diagram of circuitry for use with a dual axis resistive detector according to an embodiment of the present invention.

Yet another embodiment of a four region detector is shown in FIG. 9A. There, a resistive embodiment 701 of a four region detector comprises a non-conducting substrate 703 having deposited on it sheet resistive material to form mutually electrically isolated regions A, B, C and D. A conductive probe 705 shown as rectangular parallelpiped in FIG. 9A and partially transparent so as not to obscure substrate 703, bears centrally on the surface of the sheet resistor regions as indicated by the cross hatched area. An electrical lead to each region is connected to one terminal of a voltage source and a lead from probe 705 is connected to the other. By measuring the current through each quadrant, the resistance between the probe and each quadrant can be determined. That resistance is reflective of the relative position of the probe on the substrate. Alternatively, probe 705 and each quadrant may be connected to the terminals of a current source and the resistances between the probe and each of the quadrants determined by measuring the voltage drop along each path.

Probe 705 must be able to slide over substrate 703 without abrasion or loss of electrical contact in spite of vibrations that the elements of detector 701 may experience. It is preferred therefore that a non-conductive lubricant be placed between probe 701 and quadrants A-D so that the two elements can be gently pressed together without a loss of sensitivity to the applied force. The resistances of quadrants A-D are preferably substantially identical, a condition that may be readily achieved using conventional thick film and integrated circuit technology.

In FIG. 9B an embodiment of a measuring means for detecting X axis and Y axis movements using the sheet resistive embodiment 701 of the detector is shown. Amplifiers $A_{21}$ through $A_{24}$ are d.c. gain amplifiers each having a steady state voltage output which is a function of the value of the resistances connected to their negative sense input terminals and of the feedback resistances connected between their output terminals and negative sense input terminals. For example, the resistance between probe 705 and region A, i.e., $R_A$, is connected to the negative sense input terminal of amplifier $A_{21}$ as is one end of feedback resistor $R_{94}$ is connected to the output terminal of amplifier $A_{21}$. The feedback resistors for each amplifier and amplifier gains are chosen to give the appropriate significance to the $V_x$ and $V_y$ signals, as discussed earlier. Likewise, the entire amplifying network may be a hybrid circuit placed on the opposite side of substrate 703.

The amplifier output signals reflecting the resistances measured for each region are then combined through differential amplifiers in the manner previously explained to produce $V_x$ and $V_y$ signals. That is, the signal produced by amplifier $A_{21}$, and the signal produced by amplifier $A_{22}$, are added through load resistors $R_{102}$ and $R_{104}$, respectively, and applied to the negative sense input terminal of difference amplifier $A_{25}$. Similarly, the $R_C$ signal produced by amplifier $A_{23}$, and the $R_D$ signal produced by amplifier $A_{24}$, are added through load resistors $R_{106}$ and $R_{108}$, respectively, and applied to the positive sense terminal of difference amplifier $A_{25}$. The output signal of amplifier $A_{25}$ is then proportional to $[(R_C+R_D)-(R_A+R_B)]$ which is in turn proportional to the $V_y$ voltage described in connection with other embodiments of the quadrant embodiment of the detector. Similarly, a $V_x$ signal is generated as shown by the other circuitry in FIG. 9B wherein the $R_A$ and $R_C$ signals are combined through load resistors $R_{114}$ and $R_{116}$, respectively, and applied to the negative sense input terminal of amplifier $A_{26}$.

As with the other detector embodiments, signal selection means and balancing means, including the embodiments of FIGS. 1 and 5, may be used with the resistive embodiment of the detector. In addition, with the embodiment of the resistive detector described, mechanical balancing means for mechanical adjustment of the position of probe 705 is more effective and somewhat simpler than with the other described embodiments. Electronic balancing means may also include adjustment of the relative gains of amplifiers $A_{21}$-$A_{24}$.

The resistances of the elements of a resistive embodiment of the detector can be made large to limit total power consumption by the detector and processing circuitry to the micropower level. Power consumption may also be limited by the pulse mode means including the embodiment described in connection with FIG. 1. Since, for a resistive embodiment, the circuitry used would be identical to that shown in and described in connection with FIG. 1, except that $SW_1$ would switch the probe current on and off, there is not need to describe the pulse mode operation again.

The resistive embodiment of the detector may be used in a ski binding. Turning again to FIG. 6, substrate 703 may correspond to ski-mounted sensing element 313 and probe 705 may correspond to source element 315. Although these elements are not shown in contact in FIG. 6, it is understood that in this embodiment of the detector, contact between the elements is essential to operation. Operation of the resistive embodiment in a ski binding is similar to that of the previously described embodiments so that further discussion of that use is not necessary.

A fourth embodiment of a detector employing four sensing regions is shown in FIG. 10. In FIG. 10A is shown an end view of a physical configuration of four Hall Effect resistors A, B, C and D equidistant from each other and from a magnetic field source M. As is well known, the presence of a magnetic field causes variations of current flow in some materials and the generation of Hall voltages. This principle is exploited in conventionally available devices variously called magnistors, magnetoresistors, etc., in which resistance varies with the intensity of the ambient magnetic field. Hall Effect resistors A, B, C and D, which in contrast to other embodiments may not be coplanar, are rigidly held in place whereas magnetic field source M, which may be a permanent magnet, is allowed to move in response to various forces. A reversed configuration of magnet and Hall Effect devices and associated processing circuitry is described in my U.S. Pat. No. 4,291,894 beginning in column 25 at line 20. Because of the variation in magnetic field with position, relative to magnetic field source M, relative movements of the resistors and magnetic result in changes of resistance in resistors A, B, C and D reflective of the movement. Because of the magnetic field does not vary in a linear manner with distance from M, the response of resistance changes in somewhat non-linear; however, the non-linearity is not detrimental to operation so long as the relative movements of the magnet and resistors are small.

A measuring means similar to that of FIG. 1 could be used with the magnetic embodiment of the detector depicted in FIG. 10A. In FIG. 10B there is illustrated an alternative embodiment of a measuring means for the detector embodiment of FIG. 10A. Each magnetically sensitive resistor is connected directly in the measuring means circuit and those resistors are designated by the same letter as used in FIG. 10a. Considering the top half of FIG. 10B, a reference or standard voltage $V_{STD}$ is applied through Hall resistor $R_C$ to the negative sense input terminal of a difference amplifier $A_{30}$. Hall resistor $R_B$ is connected between the same negative sense input terminal and the output terminal of $A_{30}$. The positive sense input terminal is grounded. Therefore, the output signal $V_{30}$ of amplifier $A_{30}$ is $-(B/C)V_{STD}$. Thus, if magnet M moves in the X direction with the configuration shown in FIG. 10A, resistance $R_B$ will change in one direction and $R_C$ in the other. By so employing the ratio of the Hall Effect resistance changes, $V_{30}$ will increase or decrease depending upon the direction of movement along the X axis. Signal $V_{30}$ is connected through a series input resistor $R_{124}$ to the negative sense terminal of a difference amplifier $A_{31}$ as is one end of a feedback resistor $R_{126}$, the other end of which is connected to the output terminal of $A_{31}$. The reference signal $V_{STD}$ is applied to the positive sense terminal of amplifier $A_{31}$ through a series input resistor $R_{128}$ and a grounded shunt resistor $R_{130}$. Hence, as $V_{30}$ increases or decreases with the relative motion of magnet M with respect to resistors $R_B$ and $R_C$, $V_x$, the output signal of amplifier $A_{31}$, is proportional to $(V_{STD}-V_{30})$ or $(1+R_B/R_C)$. The circuitry in the lower half of FIG. 10B is entirely analogous so that just explained so that a detailed explanation of it is unnecessary. The output voltage of that portion of the circuit is proportional to $(V_{STD}-V_{32})$ or $(1+R_D/R_A)$, corresponding to the $V_y$ signal explained hereinbefore.

The pulse mode operation circuitry to reduce power consumption explained in connection with FIG. 1 may be used with a magnetic embodiment detector. However, since Hall Effect devices are generally usable with high impedance circuits, the pulse mode circuitry is generally unnecessary to achieve micropower operation. Hall Effect devices are not limited to resistors, and, for example, Hall Effect transistors could be used instead of resistors. With such transistors, changes in magnetic field cause the emitter-base bias voltage to change, resulting in changes in the collector-emitter voltage and current. Circuitry similar to that shown in FIG. 1 would be used to detect those changes in voltage.

The magnetic embodiment of the detector can be used in a safety ski binding. The Hall Effect elements would be rigidly mounted to the ski as element 313 in FIG. 7 and the magnet would be mounted on sole plate 315 or the relative positions of the Hall Effect elements and the magnet could be interchanged. In general, the operation of the magnetic embodiment of the detector in a safety ski binding is similar to the operation of the other embodiments. However, the torque signals (X axis variations) and force signals (Y axis variations) have a somewhat different relationship to the forces than the corresponding signals do in the other embodiments, because of the non-linearity already mentioned. The difference may be compensated for in the processing circuitry in a manner obvious to one skilled in the art.

It should be noted that the detection of motion by the embodiments of the invention described herein involve measuring variations in the effected areas of electrically responsive devices (capacitors, photo resistors, etc.), and that increased sensitivity can be achieved with increases in the areas involved. Such increases can be accomplished by enlarging the size or number of the respective source means and detection means. For instance, in the case of capacitors forming the detection and source means, one could increase the area of cooperating plates, or one could increase the number of cooperating plates. Thus, for example, in the systems of FIGS. 7A and 7B, and 8A, the respective cooperating conductive areas and capacitor plates can be considered as a plurality of such devices connected in paralled to increase the total capacitance available. Thus, $C_A$-$C_D$ are then the sums of the respective pluralities of parallel connected capacitive members.

The invention has been described with reference to certain preferred embodiments. Various additions, omissions and modifications with the scope of the described invention will be apparent to those skilled in the art. Accordingly, the invention is limited solely by the following claims.

I claim:

1. An electronic motion detector for detecting at least one direction of relative lateral movement of two bodies and the magnitude of that movement, said detector comprising:
   source means for activating said detector;
   sensing means having a plurality of electrical values changeable in response to the lateral movement of said source means with respect to said sensing means;
   measuring means connected to said sensing means for interpreting changes in said electrical values and generating output signals indicating the direction and magnitude of said lateral movement; and, electronic adjusting means connected to said measuring means for adjusting one of said output signals according to a predetermined criterion to produce an adjusted output signal, said electronic adjusting means comprising an electronic balancing means which generates a balancing signal of variable magnitude and adds said balancing signal to one of said output signals, when said source means has not moved with respect to said sensing means, to produce a summed output signal having a near-zero magnitude, said electronic balancing means comprising:

counting means for producing a counting signal changing stepwise in magnitude in one direction with time;

reference signal means for producing a balance reference signal having magnitude near zero relative to the stepwise changes of said counting signal;

switch means, connected to said counting means, for enabling said counting means and for resetting said counting signal to zero upon receipt of a balancing command;

adding means, receiving said output and counting signals, for adding said counting signal and said output signal to produce said summed output signal having an absolute magnitude approaching that of said balancing reference signal; and first comparison means receiving said summed output and balance reference signals, for comparing said summed output signal to said balance reference signal and connected to said counting means, for disabling said counting means when the absolute magnitude of said summed output signal falls below the absolute magnitude of said balance reference signal.

2. The detector of claim 1 wherein said first comparison means is connected to and resets said switch means when the absolute magnitude of said summed output signal falls below the absolute magnitude of said balance reference signal.

3. The detector of claim 1 further including:

imbalance means for producing an imbalance signal ensuring that said summed output signal has upon receipt of a balancing command by said switch means, a greater absolute magnitude than said balance reference signal, and connected to said adding means for adding said counting signal, said output signal and said imbalance signal to produce said summed output signal.

4. The detector of claim 1 further including interval counting means for periodically applying a balancing command to said switch means.

5. An electronic balancing means for nulling the output signal of an electronic sensing system producing an analog electrical output signal in response to a stimulus when no stimulus is present by adding a balancing signal to said output signal to produce a near-zero summed output signal comprising:

counting means for producing a counting signal changing stepwise in magnitude in one direction with time;

reference signal means for producing a balance reference signal having magnitude near zero relative to the stepwise changes of said counting signal;

switch means, connected to said counting means, for enabling said counting means and for resetting said counting signal to zero upon receipt of a balancing command;

adding means, receiving said output and counting signals, for adding said counting signal and said output signal to produce a summed output signal having an absolute magnitude approaching that of said balance reference signal; and first comparison means, receiving said summed output and balance reference signals, for comparing said summed output signal to said balance reference signal and connected to said counting means, for disabling said counting means when the absolute magnitude of said summed output signal falls below the absolute magnitude of said balance reference signal.

6. The electronic balancing means of claim 5 further including;

imbalance means for producing an imbalance signal ensuring that said summed output signal has upon receipt of a balancing command by said switch means, a greater absolute magnitude than said balance reference signal and connected to said adding means for adding said counting signal, said output signal and said imbalance signal to produce said summed output signal.

7. An electronic balancing means for nulling the output signal of an electronic sensing system producing an analog electrical output signal in response to a stimulus when no stimulus is present by adding a balancing signal to said output signal to produce a near-zero summed output signal comprising;

counting means for producing a counting signal either increasing or decreasing stepwise in magnitude with time, depending on the logical state of an up-down signal;

reference signal means for producing a balance reference signal having a magnitude near zero relative to the stepwise changes of said counting signal;

second comparison means, receiving said summed output and balance reference signals, and connected said counting means, for comparing said output signal to said balance reference signal and for generating said up-down signal having the proper logical state to achieve a balance condition;

switch means connected to and for enabling said second comparison and counting means upon receipt of a balancing command;

adding means, receiving said output and counting signals, for adding said counting signal and said output signal to produce said summed output signal having an absolute magnitude approaching that of said balance reference signal; and first comparison means, receiving said summed output and balance reference signals, for comparing said summed output signal to said balance reference signal and, connected to said counting means, for disabling said counting means when the absolute magnitude of said summed output signal falls below the absolute magnitude of said balance reference signal.

8. The electronic balancing means of claims 5 or 7 wherein said first comparison means is connected to and resets said switch means when the absolute magnitude of said summed output signal falls below the absolute magnitude of said balance reference signal.

9. The electronic balancing means of claims 5 or 7 or further including interval counting means for periodically applying a balancing command to said switch means.

10. In an electronic safety ski binding having a latching condition in which the binding is locked to a skier's boot and a releasing condition in which the skier's boot is released from the binding, and electronic circuitry for processing electrical force signals and for placing the binding in the releasing condition when the forces on the boot reach dangerous levels, and electronic force sensor for sensing the forces exerted on a skier's boot and for generating force signals comprising:

a sole plate for receiving a ski boot;
a ski plate for attaching to a ski;
elastic spacing means interposed between and rigidly affixed to said ski plate and said sole plate for allowing relative lateral movement of said ski plate and sole plate in response to forces encountered during skiing;
source means for activating said force sensor affixed to one of said sole plate and said ski plate;
sensing means affixed to the other of said sole plate and said ski plate for changing at least two electrical values in response to said skiing forces and said lateral movement of said sole plate with respect to said ski plate,
said source means comprising a first capacitor plate, said sensing means comprising at least two second capacitor plates forming capacitors with said first plate and said electrical values comprising the capacitance of said capacitors; and
measuring means, connected to sensing means, for interpreting changes in said electrical values and generating electrical output signals indicating the direction and magnitude of said lateral movement and said forces during skiing.

11. The force sensor of claim 10 wherein said sensing means comprises four second capacitor plates.

12. The force sensor of claims 10 or 11 wherein said first and second capacitor plates, respectively, lie on first and second substantially planar substrates disposed in opposing relationship to each other.

13. The force sensors of claims 10 or 11 wherein said measuring means comprises an oscillator generating an oscillator output signal, the frequency of said oscillator output signal being related to the capacitance of at least one of said capacitors.

14. The force sensor of claim 13 said measuring means further including frequency-to-voltage means, receiving a said oscillator output signal, for converting said oscillator output signal into a signal having a magnitude determined by the frequency of the oscillator output signal.

15. The force sensor of claims 10 or 11 further including signal selection means for selecting the larger of said measuring means output signals.

16. In an electronic safety ski binding having a latching condition in which the binding is locked to a skier's boot and a releasing condition in which the skier's boot is released from the binding, and electronic circuitry for processing electrical force signals and for placing the binding in the releasing condition when the forces on the boot reach dangerous levels, an electronic force sensor for sensing the forces exerted on a skier's boot and for generating force signals comprising:

a sole plate for receiving a ski boot;
a ski plate for attaching to a ski;
elastic spacing means interposed between and rigidly affixed to said ski plate and said sole plate for allowing relative lateral movement of said ski plate and sole plate in response to forces encountered during skiing;
sensing means affixed to the other of said sole plate and said ski plate having a plurality of electrical values changeable in response to said skiing forces and said lateral movement of said sold plate with respect to said ski plate;
measuring means, connected to sensing means, for interpreting changes in said electrical values and generating electrical output signals indicating the direction and magnitude of said lateral movement and said forces during skiing; and
electronic adjusting means connected to said measuring means for adjusting one of said output signals according to a predetermined criterion, said electronic adjusting means being an electronic balancing means which generates a balancing signal of variable magnitude and adds said balancing signal to one of said output signals when said source means has not moved with respect to said sensing means, to produce a summed output signal having a near-zero magnitude said electronic balancing means comprising:

counting means for producing a counting signal changing stepwise in magnitude in one direction which time;
reference signal means for producing a balance reference signal having magnitude near zero relative to the stepwise changes of said counting signal;
switch means, connected to said counting means, for enabling said counting means and for resetting said counting signal to zero upon receipt of a balancing command;
adding means receiving said output and counting signals, for adding said counting signal and said output signal to produce said summed output signal having an absolute magnitude approaching that of said balance reference signal; and
first comparison means, receiving said summed output and balance reference signals, for comparing said summed output signal to said balance reference signal and connected to said counting means, for disabling said counting means when the absolute magnitude of said summed output signal falls below the absolute magnitude of said balance reference signal.

17. The force sensor of claim 16 wherein said first comparison means is connected to and resets said switch means when the absolute magnitude of said summed output signal falls below the absolute magnitude of said balance reference signal.

18. The force sensor of claim 16 further including:
imbalance means for producing an imbalance signal ensuring that said summed output signal has upon receipt of a balancing command by said switch means, a greater absolute magnitude than said balance reference signal, and connected to said adding means for adding said counting signal, said output signal and said imbalance signal to produce said summed output signal.

19. In an electronic safety ski binding having a latching condition in which the binding is locked to a skier's boot and a releasing condition in which the skier's boot is released from the binding, and electronic circuitry for processing electrical force signals and for placing the binding in the releasing condition when the forces on the boot reach dangerous levels, an electronic force sensor for sensing the forces exerted on a skier's boot and for generating force signals comprising:
- a sole plate for receiving a ski boot;
- a ski plate for attaching to a ski;
- elastic spacing means interposed between and rigidly affixed to said ski plate and said sole plate for allowing relative lateral movement of said ski plate and sole plate in response to forces encountered during skiing;
- sensing means affixed to the other of said sole plate and said ski plate having a plurality of electrical values changeable in response to said skiing forces and said lateral movement of said sole plate with respect to said ski plate;
- measuring means, connected to sensing means, for interpreting changes in said electrical values and generating electrical output signals indicating the direction and magnitude of said lateral movement and said forces during skiing; and,
- electronic adjusting means connected to said measuring means for adjusting one of said output signals according to a predetermined criterion, said electronic adjusting means being an electric balancing means which generates a balancing signal of variable magnitude and adds said balancing signal to one of said output signals when said source means has not moved with respect to said sensing means, to produce a summed output signal having a near-zero magnitude, comprising:
- counting means for producing a counting signal either increasing or decreasing stepwise in magnitude with time, depending on the logical state of an up-down signal;
- reference signal means for producing a balance reference signal having a magnitude near zero relative to the stepwise changes of said counting signal;
- second comparison means, receiving said summed output and balance reference signals, and connected to said counting means, for comparing said summed output signal to said balance reference signal and for generating said up-down signal having the proper logical state to achieve a balance condition;
- switch means connected to and for enabling said second comparison and counting means upon receipt of a balancing command;
- adding means, receiving said output and counting signals, for adding said counting signal and said output signal to produce said summed output signal having a magnitude approaching that of said balance reference signal; and
- first comparison means, receiving said summed output and balance reference signals, for comparing said summed output signal to said balance reference signal and connected to said counting means, for disabling said counting means when the absolute magnitude of said summed output signal falls below the absolute magnitude of said balance reference signal.

20. The force sensor of claim 19 wherein said first comparison means is connected to and resets said switch means when the absolute magnitude of said summed output signal falls below the absolute magnitude of said balance reference signal.

21. The force sensor of claim 19 further including interval counting means for periodically applying a balancing command to said switch means.

* * * * *